(12) United States Patent
Shima

(10) Patent No.: US 6,983,415 B2
(45) Date of Patent: Jan. 3, 2006

(54) COMPUTER PERIPHERAL DEVICE AND A PROCESSING SYSTEM HAVING A HYPERTEXT INTERPRETATION SECTION AND CONTROL METHOD THEREFOR

(75) Inventor: Toshihiro Shima, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 1068 days.

(21) Appl. No.: 09/047,396

(22) Filed: Mar. 25, 1998

(65) Prior Publication Data

US 2002/0004802 A1 Jan. 10, 2002

(30) Foreign Application Priority Data

Mar. 25, 1997 (JP) .............................. 9-072214
Jan. 23, 1998 (JP) .......................... 10-011407

(51) Int. Cl.
*G06F 15/00* (2006.01)
*G06F 17/00* (2006.01)

(52) U.S. Cl. .................. 715/501.1; 715/513; 712/36; 709/218

(58) Field of Classification Search ................ 707/101, 707/6, 10, 501.1, 513; 345/428; 709/218, 709/321; 712/36; 715/501.1, 513

See application file for complete search history.

(56) References Cited

U.S. PATENT DOCUMENTS

| | | | | |
|---|---|---|---|---|
| 5,442,749 A | * | 8/1995 | Northcutt et al. | 709/219 |
| 5,764,235 A | * | 6/1998 | Hunt et al. | 345/428 |
| 5,873,077 A | * | 2/1999 | Kanoh et al. | 707/5 |
| 5,911,776 A | * | 6/1999 | Guck | 707/205 |
| 5,956,487 A | * | 9/1999 | Venkatraman et al. | 709/218 |
| 6,006,231 A | * | 12/1999 | Popa | 707/101 |
| 6,139,177 A | * | 10/2000 | Venkatraman et al. | 707/513 |
| 6,148,346 A | * | 11/2000 | Hanson | 709/321 |
| 6,275,922 B1 | * | 8/2001 | Bertsch | 712/36 |

FOREIGN PATENT DOCUMENTS

| | | |
|---|---|---|
| JP | 1-113855 | 5/1989 |
| JP | KOKAI HEI. 9-44527 | 2/1997 |
| JP | KOKAI HEI. 233243 | 9/1997 |
| JP | KOKAI HEI. 9-325925 | 12/1997 |
| JP | KOKAI HEI. 10-119393 | 5/1998 |
| JP | KOKAI HEI. 10-173890 | 6/1998 |
| WO | WO 97 18636 | 5/1997 |

OTHER PUBLICATIONS

Corcoran, P.M. et al., CEBus Network Access via the World–Wide–Web, IEEE International Conference on Consumer Electronics, Jun. 5–7, 1996, pp. 236–237.*

Suzuki, T. et al., "Teleoperation of multiple robots through the Internet", 5th IEEE International Workshop on Robot and Human Communication, Tsukuba, JP XP010212896, Nov. 11, 1996–Nov. 14, 1996, p. 545.

Rahgozar, M. A. et al., "Internet Printing", Proc. SPIE: Color Imaging, San Jose CA, U.S. XP008010353, Feb. 10, 1997–Feb. 14, 1997, vol. 3018, pp. 212–223.

(Continued)

*Primary Examiner*—William Bashore
(74) *Attorney, Agent, or Firm*—Sughrue Mion, PLLC

(57) ABSTRACT

A web browser section provided in a scanner comprises a management table for relating URLs and setup values to each other and managing them and a URL interpretation section. A URL entered from a web browser installed in an information terminal is converted into a setup value by the URL interpretation section. The setup value is set in a drive control section through a setting section, whereby an image is read under a desired read condition.

32 Claims, 25 Drawing Sheets

OTHER PUBLICATIONS

Suzuki, T. et al., "Teleoperation of multiple robots through the Internet", $5^{th}$ IEEE International Workshop on Robot and Human Communication, Tsukuba, JP, XP010212817, Nov. 11, 1996–Nov. 14, 1996, pp. 84–89.

Chang, E., "Internet based remote camera control system", Proceedings of the 1996 IEEE Intelligent Vehicles Symposium, Tokyo, JP, XP010209722, Sep. 19, 1996–Sep. 20, 1996, pp. 126–129.

Paley, S. M. et al., "Adapting EcoCyc for use on the World Wide Web", Gene, Elsevier Biomedical Press, Amsterdam, NL, XP004042696, Jun. 12, 1996, vol. 172, No. 1, pp. 43–50.

Dossick, S. E. et al., "WWW access to legacy client/server applications", Computer Networks and ISDN Systems, Elsevier, NL, XP004018197, May 1996, vol. 28, No. 7–11, pp. 931–940.

Goldberg K et al: "beyond the Web: manipulating the real world" Computer Networks and ISDN Systems, NL, North Holland Publishing. Amsterdam, vol. 28, 1, Dec. 1, 1995.

Steinfeld Edward: "Leveraging browsers as universal GUIs," Electronic Engineering Times, No. 932, Dec. 16, 1996.

Williams T: "Java Goes to Work Controlling Networked Embedded Systems" Computer Design, US, Pennwell Publ. Littleton, Massachusetts, vol. 35, No. 9, Aug. 1, 1999.

Phaser 550J User's Manual; Sony.

Computer Network and ISDN Systems, The International Journal of Computer and Telecommunications Networking, vol. 28 (1995), Nos. 1 and 2, Dec. 1995.

LAN Times, pp. 212–215, Nov. 1, 1996 (Partial Translation).

* cited by examiner

B600.html

INTRINSIC IMAGE PROVIDED ACCORDING
TO SELECTED SETUP VALUE

COMPUTER PERIPHERAL DEVICE AND A PROCESSING SYSTEM HAVING A HYPERTEXT INTERPRETATION SECTION AND CONTROL METHOD THEREFOR

BACKGROUND OF INVENTION

This invention relates to an image information input-output unit for performing input-output processing of image information, such as a scanner, a printer, a copy machine, a facsimile machine, a digital still-video camera, or a digital video camera, an image information input-output unit control method, and an image information processing system.

For example, a scanner for reading an image on a paper medium, a printer for printing on a print recording medium based on input print data, or the like is known as an image information input-output unit. The user can obtain desired image data, for example, by transferring image data between an information terminal such as a personal computer and an image information input-output unit.

That is, with a scanner, image data read through the scanner and converted into digital data by the scanner can be used in application programs of a database, document preparation (word processing) software, etc. With a printer, print data prepared by an application program of document preparation (word processing) software, etc., is input to the printer, whereby any desired print result can be obtained.

To conventionaly use an image information input-output unit, driver software to use the image information input-output unit needs to be previously installed in an information terminal. That is, for example, with the scanner, the information terminal needs to be provided with a program to read image data into the information terminal. With the printer, the information terminal needs to have a program to transfer print data to the printer.

By the way, the driver software required to use image information input-input units vary from one image information input-output unit to another. That is, the driver software used for the scanner differs from that used for the printer. The driver software for one scanner and that for another similar scanner vary depending on the scanner manufacturer, model, etc.

Therefore, the user must previously install proper driver software in the information terminal in response to his or her image information input-output unit. However, it is intricate and low in operating ease to install driver software, etc. For example, to properly use both a color ink jet printer and a monochrome laser printer in response to print, the driver software must also be changed, leading to low operability and ease of use. Particularly, in recent years, image information input-output units have been often shared through various networks such as a LAN (local area network) and an intranet. To share an image information input-output unit among a number of information terminals connected by a network, the driver software must be installed in response to the shared image information input-output unit.

It is therefore an object of the invention to provide an image information input-output unit, an image information input-output unit control method, and an image information processing system that can produce desired image information input-output processing results by separating control information for executing image processing and information entered from an information terminal (retrieval information, command information, or resource request information) for eliminating the need for machine (device)-dependent driver software and enabling seamless operation. It is another object of the invention to provide an image information input-output unit, an image information input-output unit control method, and an image information processing system that can be controlled by storing control information required for performing image information input-output processing in the image information input-output unit and indirectly specifying the control information by entering information from an information terminal. It is still another object of the invention to provide an image information input-output unit, an image information input-output unit control method, and an image information processing system that can perform various types of image information processing seamlessly under a unified operation environment without using special driver software by using a hypertext information retrieval environment (or a web server function) and read retrieval means (or a web browser) that can execute two-way communication with the information retrieval environment.

SUMMARY OF INVENTION

To those ends, control information required for causing image processing means to perform predetermined image information processing is not issued from an information terminal and is specified indirectly by entering retrieval information or command information from the information terminal, thereby causing an image information input-output unit according to the invention to perform desired image information input-output processing. The invention will be discussed with reference to FIG. 1, a schematic representation of problem solution means.

According to the first aspect of the invention, there is provided an image information input-output unit 1 comprising a hypertext information retrieval environment 2 for driving image processing means 3 based on control information, thereby performing input-output processing of image information, characterized by a management table 4 for managing retrieval information and the control information in correspondence with each other, conversion means 5 for looking up in the management table 4 based on the entered retrieval information and converting the retrieval information into predetermined control information, and control means 6 for controlling the operation of the image processing means 3 based on the control information into which the retrieval information is converted by the conversion means 5.

The "image information input-output unit 1" is a concept including image information input units, image information output units, and image information input-output units. The image information input units include a scanner, a film scanner, a digital still-video camera, a digital video camera, etc., for example. The image information output units include a printer, a plotter, a display, etc., for example. The image information input-output units include a facsimile machine, for example. The "hypertext information retrieval environment 2" means an environment to enable the user to retrieve and read a hypertext comprising information resources related to each other; specifically, it corresponds to a WWW (World Wide Web) server function, for example. The "image processing means 3" means for inputting, outputting, or inputting-outputting image information; specifically, it corresponds to a print engine, an image data read section, etc., for example. The "control information" means information required for controlling the operation of the image processing means 3; specifically, it contains setup values of color or monochrome specification, read resolution specification, etc., for example. Control code, etc., other than the setup values may be included. The "retrieval information" is information required for retrieving information resources under the hypertext information retrieval environment 2; specifically, it corresponds to a URL (Uniform Resource Locator), etc., for example.

When retrieval information is entered from the outside of the image information input-output unit 1, the conversion means 5 looks up in the management table 4 and converts the retrieval information into predetermined control information. If the entered retrieval information does not correspond to control information, it is processed as normal retrieval information. For example, when a URL of "http://xxx/action/300dpi/" is entered, if "action/300dpi/" is previously related to the control information meaning "read image at read resolution 300 dpi" in the management table 4, the URL is converted into control information by the conversion means 5, whereby the image read operation at 300 dpi is executed. On the other hand, for example, when a URL of "http://xxx/status.html/" is entered, if "status.html" is not registered in the management table 4, the URL is handled as normal retrieval information. If a document file named "status.html" exists in the information retrieval environment 2, the document file is called. The "xxx" in the URL stands for the IP address assigned to the image information input-output unit or the name of a machine containing a web server.

Retrieval information is used to indirectly specify control information, whereby predetermined image information input-output processing is performed. Thus, if the user uses an information terminal that can issue retrieval information for using the hypertext information retrieval environment 2, he or she can use the image information input-output unit without installing special driver software. Since control information is specified by entering retrieval information, the operation environment need not be changed, so that various types of image information processing can be performed seamlessly.

According to the second aspect of the invention, the management table 4 relates a sample image generation request to predetermined retrieval information for managing them, and the information retrieval environment 2 comprises sample image generation means 7 for generating prediction results of image information input-output processing based on a plurality of preset control information pieces as sample images if the sample image generation request occurs as the predetermined retrieval information is entered, sample image list information generation means 8 for generating sample image list information for relating the retrieval information pieces corresponding to the sample images to the sample images and listing the same, and transfer means 9 for transferring the sample image list information to the retrieval information entry source.

The "sample image" means an image generated by predicting the input-output result of actually performed image information processing. The processing result is checked by seeing the sample image before actual image information input-output processing is performed under the conditions set according to the control information. The sample image corresponds to a small image (thumbnail image) provided by thinning out image information provided by performing actual image information processing.

Retrieval information pieces are related to the sample images provided according to control information pieces and they are transferred, whereby the user at the retrieval information entry source (information terminal) can compare the sample images and select any desired processing result. Since the retrieval information pieces corresponding to the image information processing items are related to the sample images, the user can specify the related retrieval information piece for obtaining desired image information input-output processing result.

According to the third aspect of the invention, there is provided a control method for controlling an image information input-output unit 1 comprising a hypertext information retrieval environment 2 and a management table 4 for managing retrieval information and control information in correspondence with each other for driving image processing means 3 based on the control information, thereby performing input-output processing of image information, the control method comprising the steps of receiving the retrieval information, looking up in the management table 4 based on the received retrieval information and converting the retrieval information into predetermined control information, controlling the operation of the image processing means 3 based on the control information into which the retrieval information is converted, and transferring image information provided by the image processing means 3 to the entry source of the retrieval information.

Thus, the function similar to that of the first aspect of the invention can be provided.

According to the fourth aspect of the invention, the control method further comprises the steps of relating a sample image generation request to predetermined retrieval information for managing them in the management table 4, determining whether or not the sample image generation request is received, generating the prediction results of image information input-output processing based on a plurality of preset control information pieces as sample images if the sample image generation request is received, generating sample image list information for relating the retrieval information pieces corresponding to the sample images to the sample images and listing the same, and transferring the sample image list information to the retrieval information entry source.

Thus, the function similar to that of the second aspect of the invention can be provided.

According to the fifth aspect of the invention, the control method further comprises the step of receiving data to be processed by the image processing means 3.

The "data to be processed by the image processing means 3" means data undergoing input-output processing as image information of bit image data, etc., given to a print engine, for example. "Data reception means for receiving data to be processed by the image processing means 3" can also be added.

According to the sixth aspect of the invention, there is provided an image information processing system comprising an image information input-output unit 1 having a hypertext information retrieval environment 2 and an information terminal 11 having read retrieval means 12 for reading and retrieving the information retrieval environment 2, characterized in that the image information input-output unit 1 comprises a management table 4 for managing retrieval information and the control information in correspondence with each other, conversion means 5 for looking up in the management table 4 based on the retrieval information entered through the read retrieval means 12 and converting the retrieval information into predetermined control information, and control means 6 for controlling the operation of image processing means 3 based on the control information into which the retrieval information is converted by the conversion means 5.

The "information terminal 11" means a personal computer, a portable information terminal, etc., for example.

In addition, it may be mounted temporarily on the image information input-output unit 1 as a control panel thereof. Preferably, the information terminal 11 comprises an input unit 13 for entering retrieval information, etc., and a display unit 14 for displaying the result of reading the information retrieval environment 2, etc. The input unit 13 includes a keyboard, a pointing device such as a mouse, a tablet, a plasma display, etc., for example. The display unit 14 includes a CRT, a liquid crystal display, a plasma display, etc., for example. The "read retrieval means 12" is means for using the hypertext information retrieval environment 2; for example, it corresponds to a web browser, etc.

The user can use the read retrieval means 12 to use the hypertext information retrieval environment 2 installed in the image information input-output unit 1 or any other unit and can enter predetermined retrieval information previously registered in the management table 4, thereby instructing the image information processing system to perform desired image information processing of print output, image read, etc. The user uses retrieval information to specify control information and thus can simply enter predetermined retrieval information registered in various units for performing various types of image information processing. For example, if the information terminal 11 is connected to printers and scanners by a network such as a LAN, the user needs only to enter retrieval information through the read retrieval means 12, whereby print output on the printer, image read through the scanner, and the like can be performed smoothly. That is, single operation means of the read retrieval means 12 enables the user to use various image information input-output units 1.

According to the seventh aspect of the invention, the management table 4 relates a sample image generation request to predetermined retrieval information for managing them, and the information retrieval environment 2 comprises sample image generation means 7 for generating the prediction results of image information input-output processing based on a plurality of preset control information pieces as sample images if the sample image generation request occurs as the predetermined retrieval information is received from the read retrieval means 12, sample image list information generation means 8 for generating sample image list information for relating the retrieval information pieces corresponding to the sample images to the sample images and listing the same, and transfer means 9 for transferring the sample image list information to the read retrieval means.

Thus, the user can compare the sample images through the read retrieval means 12 and select any desired sample image. Retrieval information pieces corresponding to control information pieces for performing the image information processing items related to the sample images are related to the sample images in a one-to-one correspondence with each other. Therefore, the user can enter predetermined retrieval information in the image information input-output unit 1 simply by selecting a desired sample image for obtaining desired image information processing result.

The invention can also be understood as follows: It will be discussed with reference to FIG. 2, a schematic representation of problem solution means.

According to the eighth aspect of the invention, there is provided an image information input-output unit 21 for driving image processing means 22 based on control information, thereby performing input-output processing of image information, the image information input-output unit 21 comprising a management table 23 for managing control information and command information related to processing items that can be processed by the image processing means 22 in correspondence with each other, reception means 24 for receiving a request for transferring a processing list information indicating the processing items processed by the image processing means 22, processing list information generation means 25 for relating command information pieces to the processing list information pieces and returning the information pieces to the processing list information transfer requester if the processing list information transfer request is received, conversion means 26 for converting the command information into predetermined control information based on the management table 23 if the command information is entered based on the processing list information, and control means 27 for causing the image processing means 22 to perform the processing item based on the predetermined control information into which the command information is converted.

Preferably, a hypertext information retrieval environment 2 is provided, but the invention is not limited to it. That is, the image information input-output unit 21 and the information terminal 31 may be connected by a communication protocol enabling two-way communication, whereby control information in the image information input-output unit 21 can be specified indirectly through command information. The "command information" means information to specify control information and is not limited to retrieval information as in the first aspect of the invention.

According to the ninth aspect of the invention, the processing list information is information listing the prediction results of image processing performed by the image processing means 22 as sample images.

Thus, the function similar to that of the second aspect of the invention can be provided.

According to the tenth aspect of the invention, there is provided an image information processing system comprising an image information input-output unit 21 for driving image processing means 22 based on control information, thereby performing input-output processing of image information and an information terminal 31 for entering information in the image information input-output unit 21, thereby causing the image information input-output unit 21 to perform desired image processing, characterized in that the image information input-output unit 21 comprises a management table 23 for managing control information and command information related to processing items that can be processed by the image processing means 22 in correspondence with each other, reception means 24 for receiving a request for transferring a processing list information indicating the processing items processed by the image processing means 22 from the information terminal 31, processing list information generation means 25 for relating command information pieces to the processing list information pieces and returning the information pieces to the information terminal 31 if the processing list information transfer request is received, conversion means 26 for converting the command information into predetermined control information based on the management table 23 if the command information is entered from the information terminal 31 based on the processing list information, and control means 27 for causing the image processing means 22 to perform the processing item based on the predetermined control information into which the command information is converted, and that the information terminal 31 comprises processing list information transfer request generation means 32 for generating the processing list information transfer request, selection means 33 for selecting a desired processing item based on the processing list information returned from the processing list information generation means, and selection information input means 34 for entering the command information related to the selected processing item in the image information input-output unit 21.

Thus, the user can check a list of the processing items that can be executed by the image information input-output unit 21. Since command information pieces are related to the processing list information items, the user can simply select a desired processing item, thereby entering the command information related to the processing item in the image information input-output unit 21. The command information entered from the information terminal is converted into predetermined control information by the conversion means 26 and the control information is input to the control means 27.

According to the eleventh aspect of the invention, the processing list information is information listing the prediction results of image processing performed by the image processing means 22 as sample images.

Thus, the effects similar to those of the second aspect of the invention can be produced.

According to the twelfth aspect of the invention, the information terminal 31 further includes storage means 35 for saving the selected command information.

Once selected command information is saved on the storage means 35, whereby a similar processing item can be obtained promptly at the next image information processing time.

According to the thirteenth aspect of the invention, there is provided a program recording medium for recording a program for driving image processing means based on control information, thereby performing input-output processing of image information, the program recording medium for recording the program for causing a computer to provide a function of generating a hypertext information retrieval environment, a management function of managing retrieval information for using the information retrieval environment and the control information in correspondence with each other, and a conversion function of converting entered retrieval information into predetermined control information in a format that can be read and understood by the computer.

For example, floppy disk, hard disk, compact disk, magneto-optic disk, magnetic tape, memory, or any other type of recording medium can be adopted as the "recording medium." In addition to the physical recording media, a communication medium for remotely downloading the program over a communication line can also be used, for example.

The program is read into the microcomputer system of the image information input-output unit, thereby providing a unit comprising the hypertext information retrieval environment, the management function, and the conversion function. Therefore, the function similar to that of the first aspect of the invention can be provided.

According to the fourteenth aspect of the invention, the management function relates a sample image generation request to predetermined retrieval information for managing them, and the program can cause the computer to further provide a sample image generation function of generating prediction results of image information input-output processing based on a plurality of preset control information pieces as sample images if the sample image generation request occurs as the predetermined retrieval information is entered, a sample image list information generation function of generating sample image list information for relating the retrieval information pieces corresponding to the sample images to the sample images and listing the same, and a transfer function of transferring the sample image list information to the retrieval information entry source.

Thus, the function similar to that of the second aspect of the invention can be provided.

According to the fifteenth aspect of the invention, there is provided a program recording medium for recording a program for driving image processing means based on control information, thereby performing input-output processing of image information, the program recording medium for recording the program for causing a computer to provide a management function of managing control information and command information related to processing items that can be processed by the image processing means in correspondence with each other, a reception function of receiving a request for transferring a processing list information indicating the processing items processed by the image processing means, a processing list information generation function of relating command information pieces to the processing list information pieces and returning the information pieces to the processing list information transfer requester if the processing list information transfer request is received, and a conversion function of converting the command information into predetermined control information based on the management table if the command information is entered based on the processing list information in a format that can be read and understood by the computer.

The program is built in a microcomputer system, whereby the function similar to that of the eighth aspect of the invention can be provided.

According to the sixteenth aspect of the invention, the processing list information can be information listing the prediction results of image processing performed by the image processing means as sample images.

Thus, the function similar to that of the ninth aspect of the invention can be provided.

According to the seventeenth aspect of the invention, there is provided an image information input-output unit comprising a web page function for driving image processing means based on control information, thereby performing input-output processing of image information, characterized by web page generation means for generating a web page having resource request information related to processing items that can be processed by the image processing means, management table for managing the resource request information and the control information in correspondence with each other, conversion means for converting the resource request information selected through the web page into predetermined control information based on the management table, and control means for controlling the operation of the image processing means based on the control information into which the resource request information is converted.

The "resource request information" is information for requesting the web server to transmit an information resource and specifically refers to URL. The "web page" means a file in an HTML (HyperText Markup Language) format.

For example, the web page generation means relate resource request information pieces to the processing items in a one-to-one correspondence with each other and generates a web page. If the user who reads the web page through the web browser selects a desired processing item, the resource request information piece related to the processing item is entered in the image information input-output unit. The conversion means converts the entered resource request information piece into control information and passes the control information to the control means, whereby the control information can be specified indirectly according to the resource request information as in the first aspect of the invention.

According to the eighteenth aspect of the invention, the resource request information can contain history information of the selected processing item.

The "history information" means information indicating a selection history of the processing items selected in the past in a selection operation sequence. For example, when resolution is already selected by the preceding selection operation, the resource request information related to the web page contains the selected resolution information. For example, assume that a resolution selection button and a halftone processing selection button are displayed on the web page and that resolution is first selected, then halftone processing is selected. When only resolution is selected at the beginning, resource request information of "http://xxx/resolution selection/" is generated. When halftone processing is next selected, new resource request information containing the previously selected resolution information (history information) is generated like "http://xxx/resolution selection/halftone processing selection/." Thus, whenever a processing item executed by the image processing means is selected, new resource request information containing the previously selected processing item history information is generated, whereby the last entered resource request information can be converted into control information by the conversion means in batch.

For example, as in the ninteenth aspect of the invention, the web page generation means can analyze received resource request information, detect the history information, and relate the resource request information containing the history information to the processing item, thereby generating the web page.

That is, the web page generation means analyzes the structure of entered resource request information, detects the history information, generates new resource request information containing the history information, and relates the resource request information to the processing item on the web page. In the above-given example, when the resolution is selected, new resource request information containing the already selected resolution information is related to each halftone processing selection button like "http://xxx/resolution selection/dither processing/" or "http://xxx/resolution selection/error diffusion method/." In other words, the web page generation means updates the resource request information so as to contain processing item history information, whereby entered resource request information can hold all history information selected in the past.

According to the twentieth aspect of the invention, the web page can list the processing patterns that can be processed by the image processing means and the resource request information pieces for realizing the processing patterns can be related to the processing patterns in a one-to-one correspondence with each other.

That is, the web page lists selectable processing patterns such as "600 dpi+dither processing" (http://xxx/600/dither/), "600 dpi+error diffusion method" (http://xxx/600/error diffusion/), "300 dpi+dither processing" (http://xxx/300/dither/), and "300 dpi+error diffusion method" (http://xxx/300/error diffusion/), and the resource request information pieces for realizing the processing patterns are related to the processing patterns in a one-to-one correspondence with each other. Therefore, the user needs only to select a desired processing pattern; operability is improved.

According to the twenty-first aspect of the invention, there is provided a control method for controlling an image information input-output unit comprising a web page function and management table for managing the resource request information and the control information in correspondence with each other for driving image processing means based on the control information, thereby performing input-output processing of image information, the control method comprising a first step of generating a web page having resource request information related to processing items that can be processed by the image processing means, a second step of receiving resource request information specified through the web page, a third step of converting the received resource request information into predetermined control information based on the management table, a fourth step of controlling operation of the image processing means based on the control information into which the resource request information is converted, and a fifth step of preparing a web page containing image information provided by the image processing means and transferring the web page to the resource request information entry source.

Thus, the function similar to that of the seventeenth aspect of the invention can be provided.

According to the twenty-second aspect of the invention, the resource request information can contain history information of the selected processing item.

Thus, the function similar to that of the eighteenth aspect of the invention can be provided.

According to the twenty-third aspect of the invention, the first step web can analyze received resource request information, detect the history information, and relate the resource request information containing the history information to the processing item, thereby generating the web page.

Thus, the function similar to that of the ninteenth aspect of the invention can be provided.

According to the twenty-fourth aspect of the invention, the web page can list the processing patterns that can be processed by the image processing means and the resource request information pieces for realizing the processing patterns can be related to the processing patterns.

Thus, the function similar to that of the twentieth aspect of the invention can be provided.

According to the twenty-fifth aspect of the invention, there is provided an image information processing system comprising an image information input-output unit having a web server function and an information terminal having a web browser for using the web server function, characterized in that the image information input-output unit comprises image processing means driven based on control information, web page generation means for generating a web page having resource request information related to processing items that can be processed by the image processing means and transmitting the web page to the information terminal, a management table for managing the resource request information and the control information in correspondence with each other, conversion means for converting the resource request information selected through the web page according to the web browser into predetermined control information based on the management table, and control means for controlling the operation of the image processing means based on the control information into which the resource request information is converted.

Thus, the image information input-output unit can be operated according to the web browser contained in the information terminal without installing peculiar driver software and the function similar to that of the seventeenth aspect of the invention can be provided.

According to the twenty-sixth aspect of the invention, the resource request information can contain history information of the selected processing item.

Thus, the function similar to that of the eighteenth aspect of the invention can be provided.

According to the twenty-seventh aspect of the invention, the web page generation means can analyze received resource request information, detect the history information, and relate the resource request information containing the history information to the processing item, thereby generating the web page.

Thus, the function similar to that of the ninteenth aspect of the invention can be provided.

According to the twenty-eighth aspect of the invention, the web page can list the processing patterns that can be processed by the image processing means and the resource request information pieces for realizing the processing patterns can be related to the processing patterns.

Thus, the function similar to that of the twentieth aspect of the invention can be provided.

According to the twenty-ninth aspect of the invention, there is provided a program recording medium for recording a program for driving image processing means based on control information, thereby performing input-output processing of image information, the program recording medium for recording the program for causing a computer to provide a web server function of providing a web page in response to resource request information, a web page generation function of generating a web page having resource request information related to processing items that can be processed by the image processing means, management table for managing the resource request information and the control information in correspondence with each other, and conversion means for converting the resource request information selected through the web page into predetermined control information based on the management function in a format that can be read and understood by the computer.

Thus, the function similar to that of the seventeenth aspect of the invention can be provided.

According to the thirtieth aspect of the invention, the resource request information can contain history information of the selected processing item.

Thus, the function similar to that of the eighteenth aspect of the invention can be provided.

According to the thirty-first aspect of the invention, the web page generation function analyzes received resource request information, detects the history information, and relates the resource request information containing the history information to the processing item, thereby generating the web page.

Thus, the function similar to that of the ninteenth aspect of the invention can be provided.

According to the thirty-second aspect of the invention, the web page lists the processing patterns that can be processed by the image processing means and the resource request information pieces for realizing the processing patterns are related to the processing patterns.

Thus, the function similar to that of the twentieth aspect of the invention can be provided.

DETAILED DESCRIPTION OF PREFERRED EMBODIMENTS

Referring now to the accompanying drawings, there are shown preferred embodiments of the invention.

1. FIRST EMBODIMENT

Figure 1:
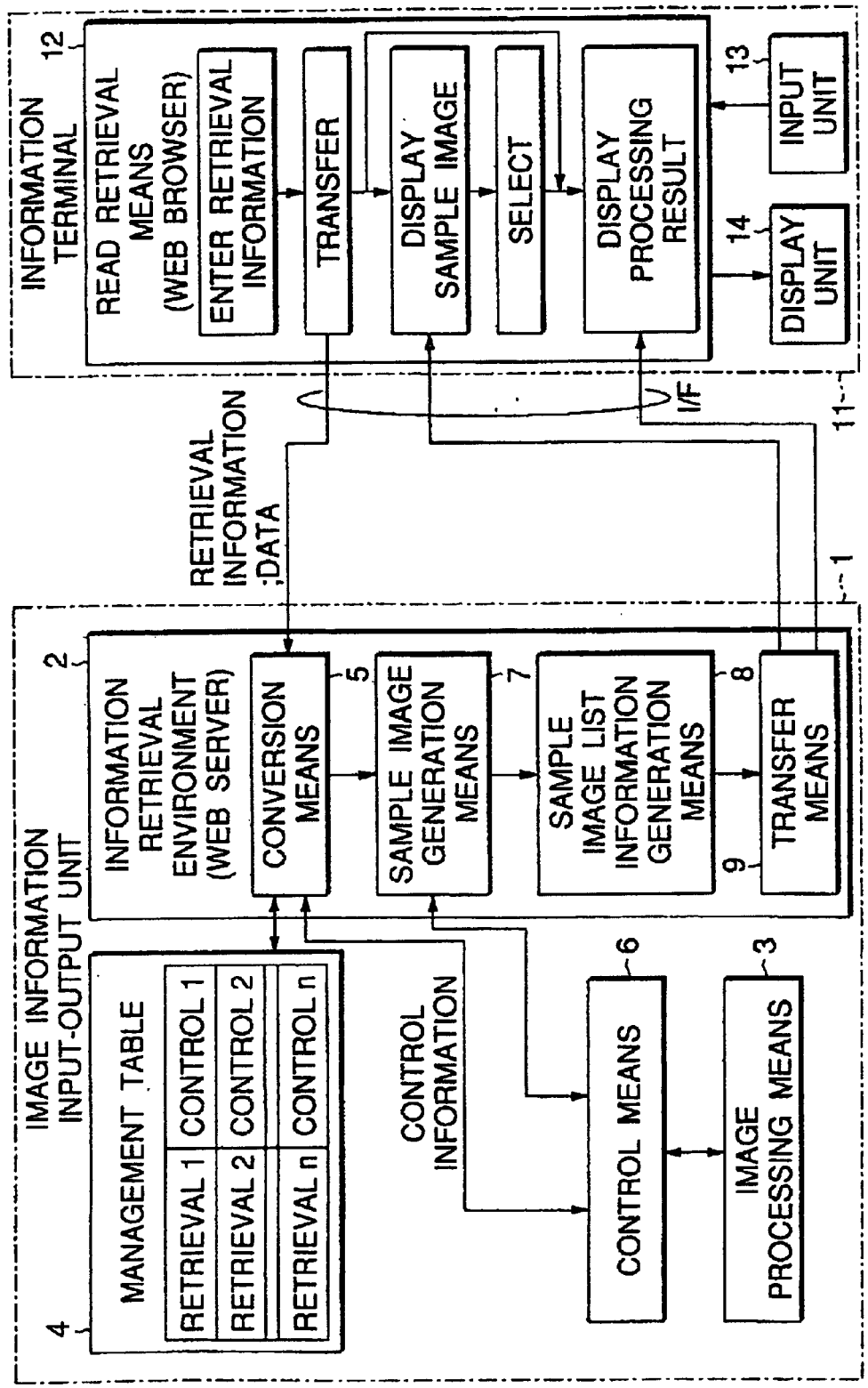
FIG. 1 is a functional block diagram to explain a functional configuration of the invention.
Figure 2:
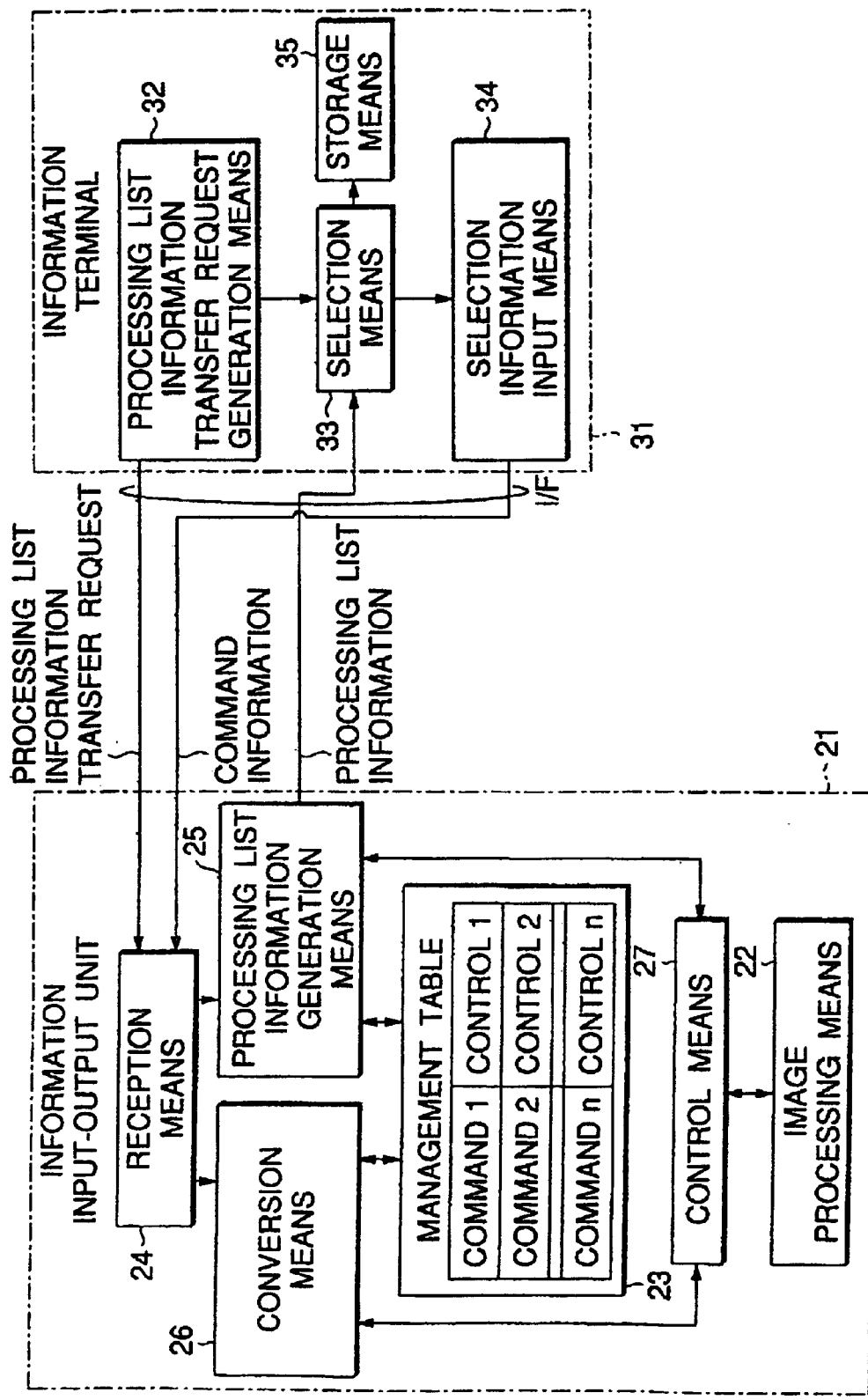
FIG. 2 is a functional block diagram to explain another functional configuration of the invention.
Figure 3:
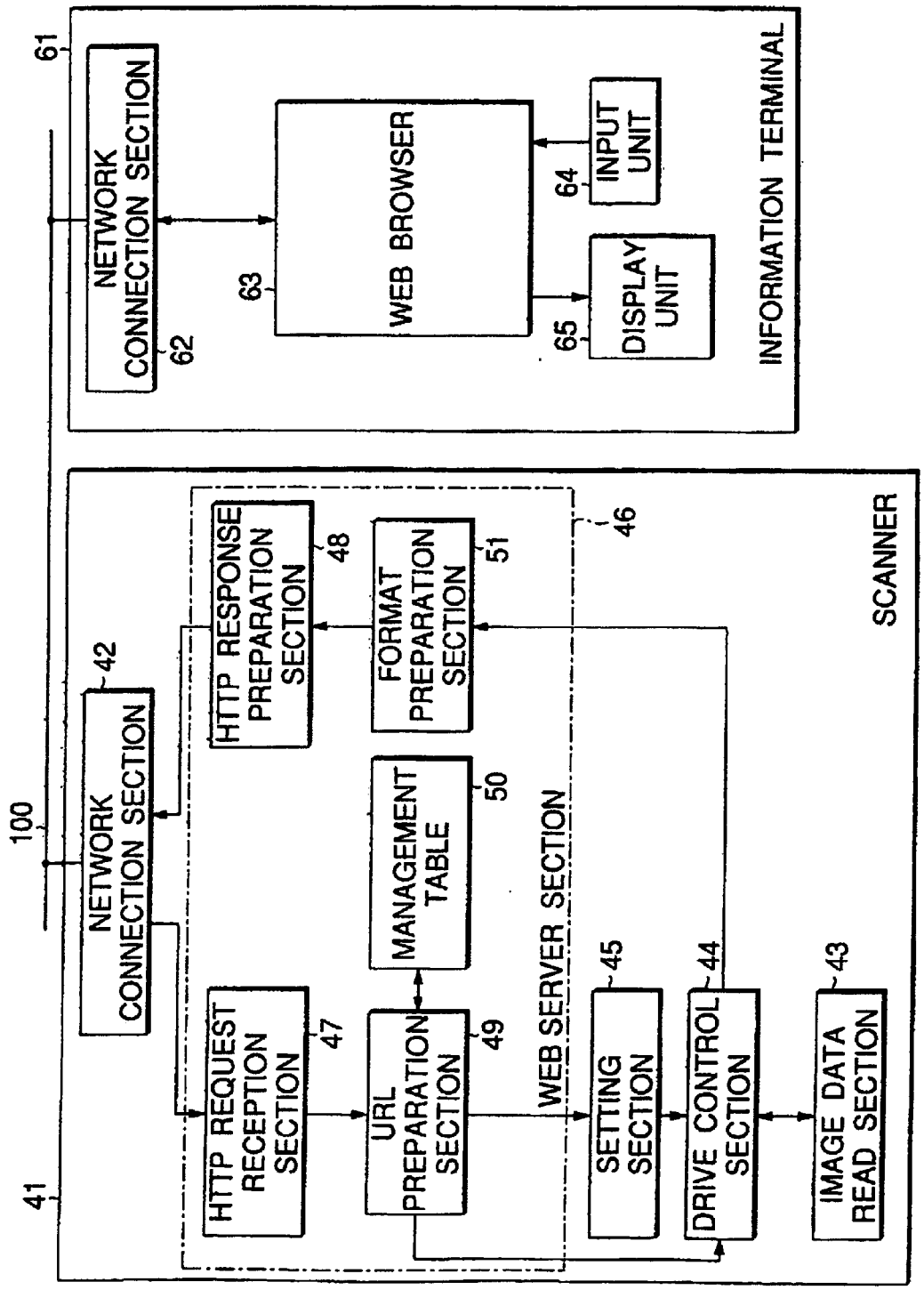
FIG. 3 is a block diagram of an image information processing system according to a first embodiment of the invention applied to a scanner.

FIGS. 3–8 relate to a first embodiment of the invention. FIG. 3 is a block diagram to show the configuration of an image information processing system according to the embodiment.

1-1 Functional Configuration of Scanner

A scanner 41 as an "image information input-output unit" according to the first embodiment comprises a network connection section 42, an image data read section 43, a drive control section 44, a setting section 45, and a web server section 46, as described later.

The network connection section 42 is provided for two-way communication with an information terminal 61 (described later) over a communication line 100; specifically, it comprises protocols such as TCP/IP (Transmission Control Protocol/Internet Protocol) and HTTP (HyperText Transfer Protocol), for example.

The image data read section 43 comprises an optical system consisting of an image pick-up device such as a line CCD and a light source and an optical system drive mechanism for scanning the optical system, for example. While light incident on a read object of an original, etc., from the light source and reflected from the read object is photoelectrically converted by the image pick-up device, the optical system is scanned, whereby image data can be read.

The drive control section 44 controls drive of the image data read section 43 and the drive control section 44 and the image data read section 43 make up "image processing means." The drive control section 44 comprises a drive mechanism control section for controlling the optical system drive mechanism and a signal processing section for processing output signals from the image pick-up device, for example.

The setting section 45 is provided for inputting various setup values as "control information" into the drive control section 44 and forms "control means." More particularly, the setting section 45 is used to input various setup values of read resolution, halftone processing algorithm, etc., into the drive control section 44 for reading image data in a predetermined mode.

The web server section 46 provides a WWW (World Wide Web) function and corresponds to a "hypertext information retrieval environment." It has a function of transferring an HTML format file specified with URL (Uniform Resource Locator) from the information terminal 61 according to the HTTP.

The web server section 46 comprises an HTTP request reception section 47 for receiving an HTTP request such as URL entered from the information terminal 61, an HTTP response preparation section 48 for generating an HTTP response returned to the information terminal 61 in response to the HTTP request, a URL interpretation section 49, a management table 50, and a format preparation section 51.

Figure 4:
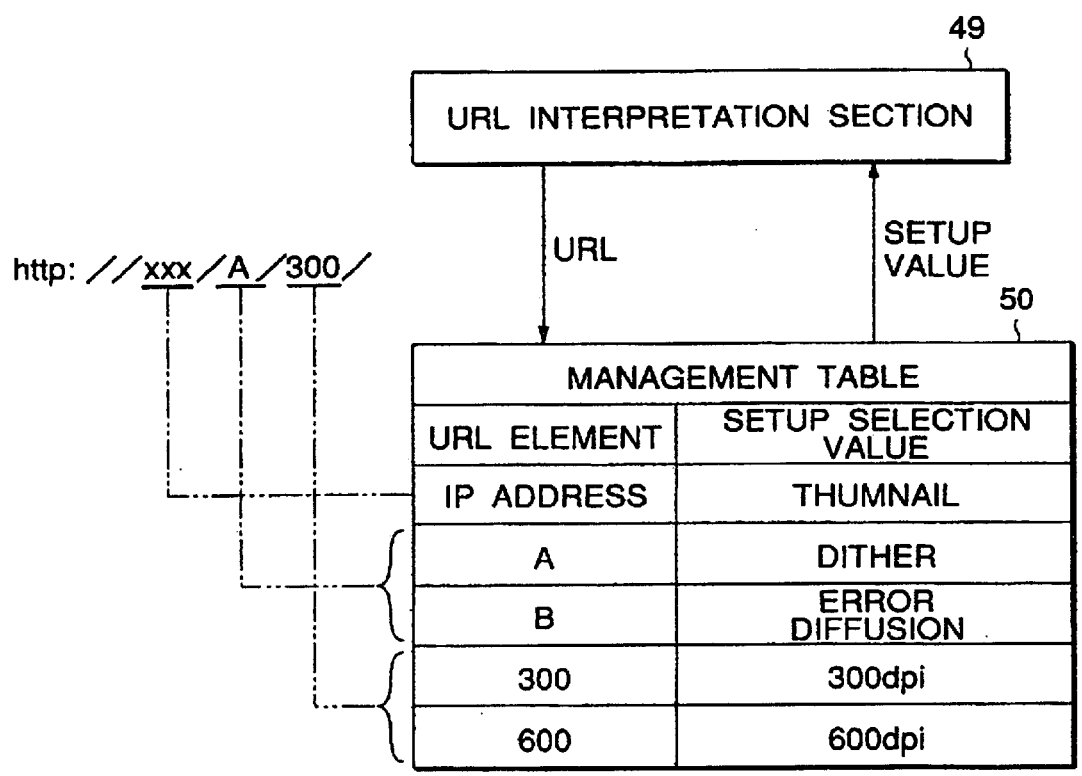
FIG. 4 is a schematic representation to show the format of a management table, etc.

The URL interpretation section 49 as "conversion means" interprets the URL input through the HTTP request reception section 47 by looking up the URL in the management table 50. As shown in FIG. 4, the management table 50 stores predetermined setup values in a one-to-one correspondence with URL entries for each URL type. Specifically, for example, setup values are stored in a one-to-one correspondence with items of read resolution, halftone processing algorithm, etc. Setup values to generate "sample image list information" or "processing content list information" are related to the IP address assigned to the scanner 41. Therefore, for example, if an URL of "http://xxx/B600.html" is input, the URL interpretation section 49 looks up in the management table 50 based on the URL, thereby converting the URL into setup values to realize a process of "reading image data at read resolution 600 dpi processed by error diffusion method."

The format preparation section 51 converts image data read by the image data read section 43 into an image file in a format that can be read with a web browser, such as JPEG (Joint Photographic Experts Group) or GIF (Graphics Interchange Format). The image file in a predetermined format is embedded in an HTML format file by the HTTP response preparation section 48.

1-2 Functional Configuration of Information Terminal 61

For example, the information terminal 61 such as a personal computer or a portable information terminal is a WWW client using the web server section 46. It comprises a network connection section 62, a web browser 63, an input unit 64, and a display unit 65.

Like the network connection section 42 of the scanner 41, the network connection section 62 comprises protocols such as TCP/IP and HTTP.

The web browser as "read retrieval means" is provided for reading or retrieving HTML format files in the web server section 46. For example, an HTML format file is specified with an URL as "retrieval information" or "command information," such as "http://server name/directory name/file name," whereby the file can be read. A predetermined URL, namely, a URL previously entered in the management table 50 is input to the web server section 46 by the web browser 63, whereby image data can be read under a desired setting condition.

The input unit 64 is used to enter a URL, etc.,; for example, a keyboard, a pointing device, or the like can be used. The display unit 65 displays the read contents, etc.,; for example, a CRT, a liquid crystal display, or the like can be used.

1-3 Operation

Figure 5:
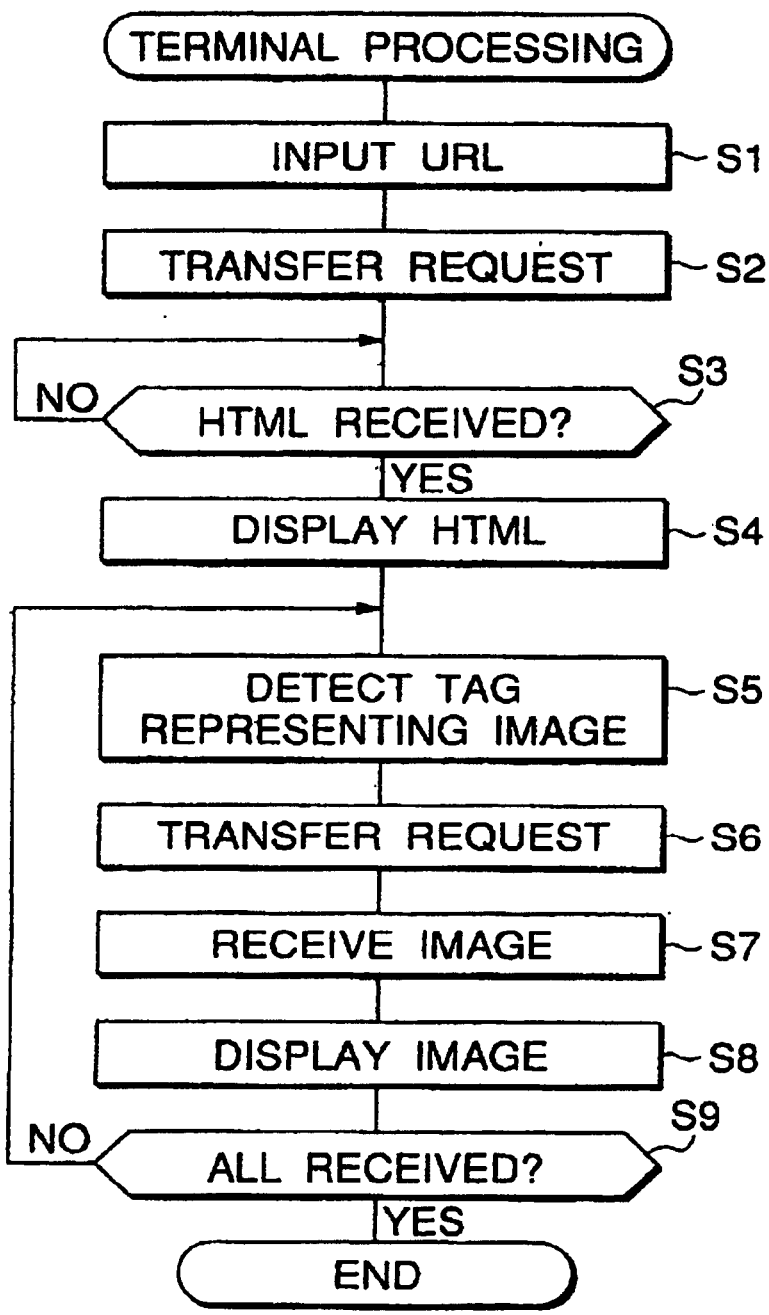
FIG. 5 is a flowchart to show information terminal processing.

Next, the operation of the embodiment will be discussed with reference to FIGS. 5–8. FIG. 5 is a flowchart to show read retrieval processing executed by the web browser 63. A sample image transfer request, etc., can be made in response to a URL input to the read retrieval means 63.

When a URL is input at step S1, an HTTP request generated as the event occurs is transferred to the scanner 41 through the network connection section 62 at step S2. A wait is made for receiving an HTML format file returned from the scanner 41 in response to the HTTP request at step S3.

If the HTML format file is returned from the scanner 41, it is displayed on the display unit 65 at step S4. Next, a tag as link information embedded in the HTML format file is detected at step S5 and an HTTP request for transferring an image file such as JPEG linked by the tag is transferred to the scanner 41 at step S6. This image file transfer request can be made by using a GET command, etc. At step S7, when the image file is returned from the scanner 41 in response to the HTTP request issued at step S6, it is displayed on the display unit 65 at step S8. The steps S5–S8 are repeated until all image files embedded in the HTML format file received at step S3 are received at step S9. Upon reception of all image files, the processing is terminated.

It should be noted that the specific processing contents at steps S1–S9 vary depending on the URL input at step S1. In other word, the flowchart shown in FIG. 5 can be used in various forms simply by changing the input URL.

(1) To Make a Request for Displaying a Thumbnail Image

Figure 7:
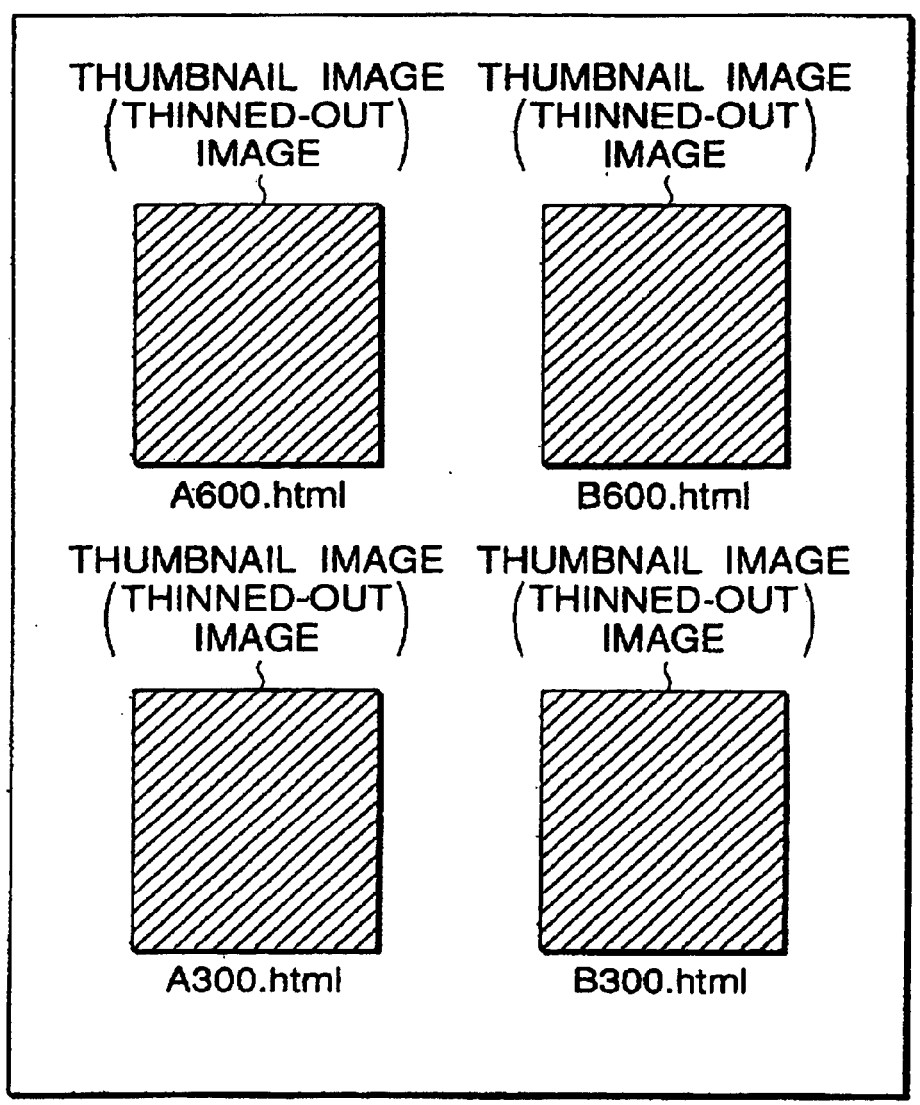
FIG. 7 is a schematic representation of a screen listing thumbnail images of scan prediction images.

A thumbnail image as a "sample image" is small image data provided by thinning out image data to be originally obtained. In the embodiment, the thumbnail image indicates the prediction result (prescan) before formal image read is executed. As shown in FIG. 7 described later, in the embodiment, various image read modes that can be provided by the scanner 41 are shown on the information terminal 61 according to an HTML format file in which a number of thumbnail images are embedded.

A URL to make a request for listing thumbnail images is specified as the IP address of the scanner 41, for example. That is, if the URL input at step S1 is "http://IP address/" not followed by a directory name, file name, etc., the URL interpretation section 49 interprets the URL as a "request for preparing a thumbnail image list."

When an HTML format file as a menu screen for displaying thumbnail images is returned from the scanner 41 at steps S3 and S4, an image file transfer request of each thumbnail image embedded in the HTML format file is transferred and returned images are displayed together with HTML at steps S5–S9.

(2) To Give an Image Read Instruction

To send an image read instruction from the information terminal 61 to the scanner 41, various setup values of read resolution, halftone processing algorithm, etc., are specified indirectly through a URL. For example, if a URL of a structure like "http://IP address/algorithm selection/resolution selection/" is input at step S1, the URL interpretation section 49 converts the input URL into various setup values required for image read processing. When image read is executed in the specified image read mode, an HTML format file indicating the scan result is returned from the scanner 41 at steps S3 and S4 and the image files embedded in the HTML format file are displayed at steps S5–S9.

(3) To Give an Operation Instruction to Another Image Information Input-output Unit If another image information input-output unit is connected over the communication line 100 and has a web server section serving a similar function to that in the embodiment, a predetermined URL entered in the web server section is input at step S1, whereby the image information input-output unit can be operated.

(4) To Use as a Normal Web Browser

For example, to access a WWW server on the Internet for reading a web page, etc., the URL of the desired web page may be entered at step S1, whereby two-way communication with the WWW server is executed.

Figure 6:
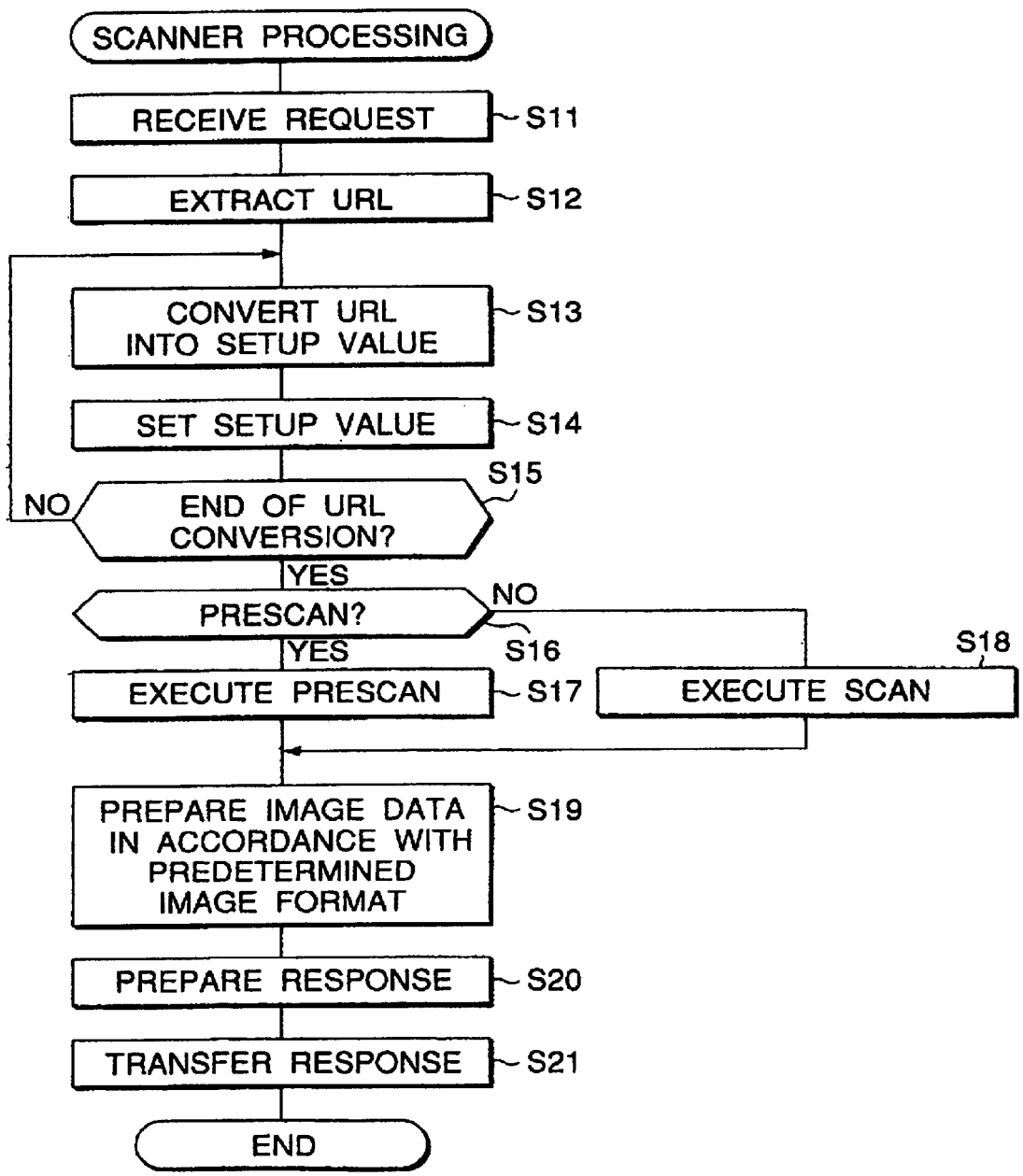
FIG. 6 is a flowchart to show scanner processing.

Next, processing of the scanner 41 will be discussed with reference to a flowchart shown in FIG. 6.

First, when an entered HTTP request is received from the information terminal 61 at step S11, the URL in the HTTP request is extracted at step S12. The URL interpretation section 49 looks up in the management table 50 based on the extracted URL and converts an element of the URL into the corresponding setup value at step S13, and inputs the setup value into the setting section 45, which then sets the setup value in the drive control section 44 at step S14. The steps S13 and S14 are repeated until all elements of the URL received at step S11 are converted at step S15.

Next, whether or not a prescan execution instruction is given for generating thumbnail images is determined at step S16. If the URL received at step S11 contains only the IP address of the scanner 41, it is determined that a prescan execution request is made, as described above. However, the invention is not limited to it as is obvious to those skilled in the art. For example, prescan can also be executed by entering a URL of a structure of "http://IP address/prescan."

Since which of prescan and original scan the URL specifies can be determined uniquely as a result of the URL interpretation, there is a possibility that the decision block at step S16 will not appear on the program. The step S16 is shown for understanding the invention.

If the URL received at step S11 specifies the setup value of prescan execution, prescan is executed at step S17. Specifically, an image of an original, etc., is read rapidly so as to provide a thinned-out image at 72*72 dpi. The format preparation section 51 converts the read image into a predetermined image format that can be used with WWW of JPEG, GIF, etc., for example, at step S19. The HTTP response preparation section 48 embeds the image file in an HTML format file through a tag, thereby preparing an HTTP response at step S20. The HTML format file created as the HTTP response is transferred through the network connection section 42 to the information terminal 61 at step S21.

On the other hand, if the URL received at step S11 specifies the setup value related to formal scan execution, an image is read in accordance with the specified setup conditions at step S18. The read image is converted into an image file in a predetermined format at step S19. An HTML format file is created at step S20 and is transferred to the information terminal 61 at step S21.

Figure 8:
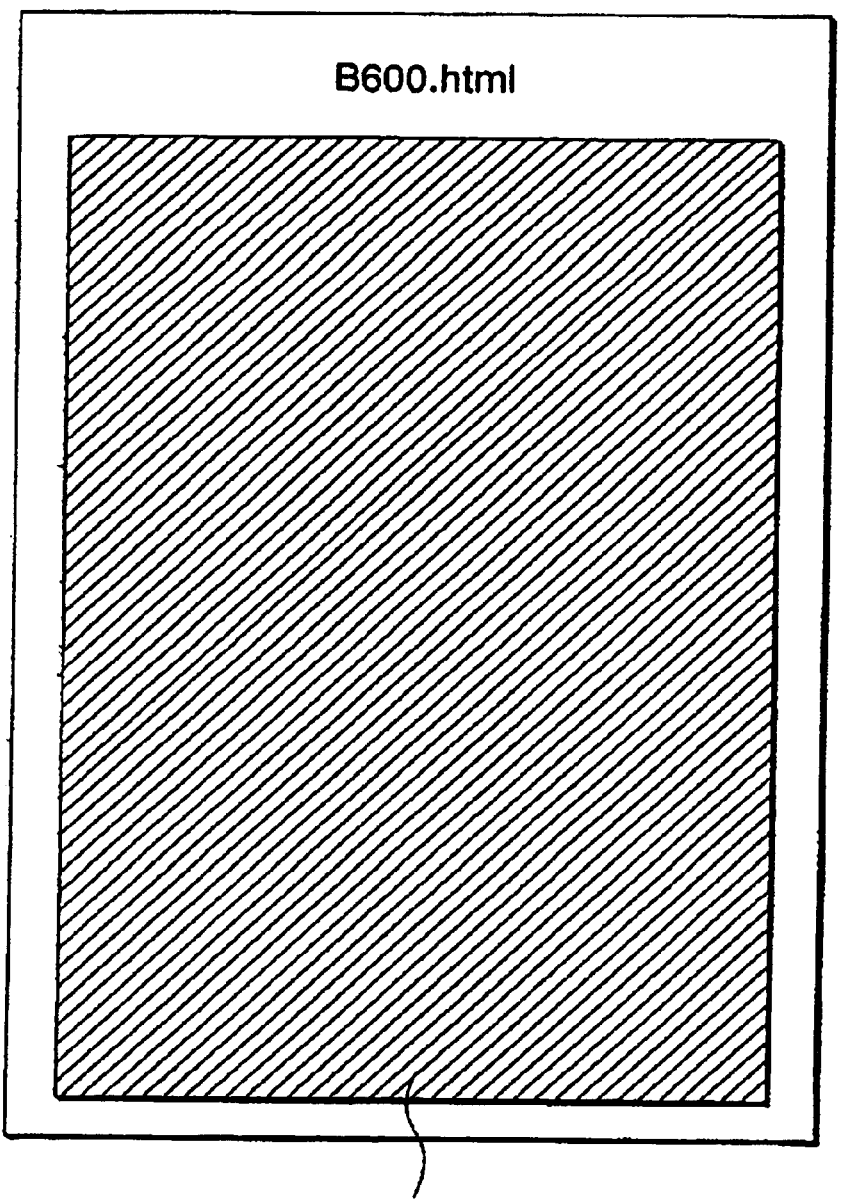
FIG. 8 is a schematic representation of a screen displaying an image provided according to a desired setup value.
Figure 9:
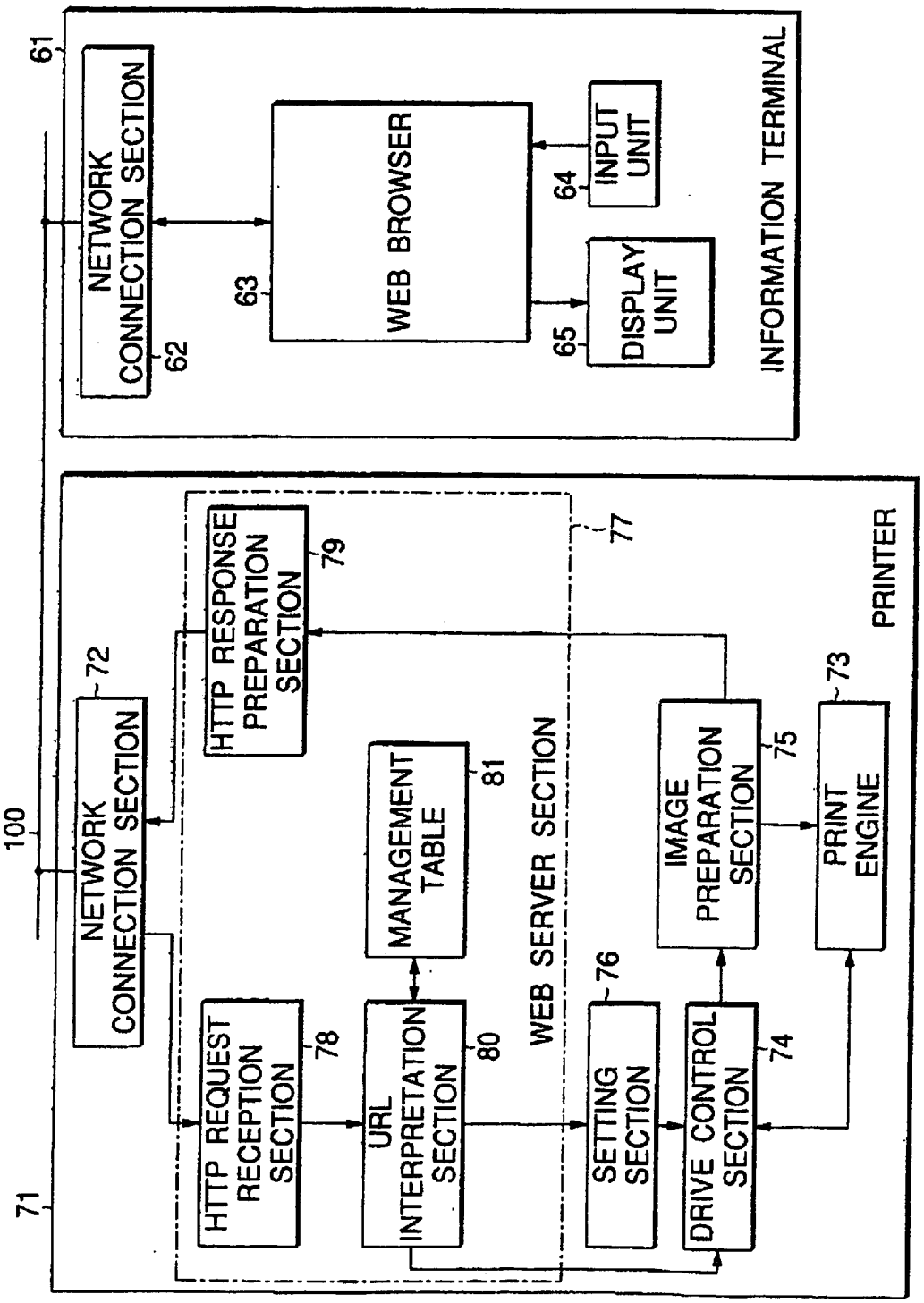
FIG. 9 is a block diagram of an image information processing system according to a second embodiment of the invention applied to a printer.

The setup value specification method with a URL will be discussed with reference to FIGS. 7 and 8. FIG. 7 shows a thumbnail image listing screen. As described above, the thumbnail image listing screen has nature as a menu screen to comprehensively show image read settings that can be executed by the scanner 41.

For example, a prediction image when image read is executed at resolution 600 dpi processed by a dither method (A600.html) is shown in the upper left portion of FIG. 7; a prediction image when image read is executed at resolution 600 dpi processed by an error diffusion method is shown in the upper right portion of FIG. 7; a prediction image when image read is executed at resolution 300 dpi processed by the dither method is shown in the lower left portion of FIG. 7; and a prediction image when image read is executed at resolution 300 dpi processed by the error diffusion method is shown in the lower right portion of FIG. 7.

Therefore, the user can select the optimum image read condition (setup value) by comparing the thumbnail images on the screen and, for example, selecting the optimum thumbnail image with the pointing device, etc., or directly entering a desired URL through the keyboard, etc. When the user selects or enters the URL, the URL is transferred to the scanner 41 as an HTTP request and desired image read is executed. The read image is returned to the information terminal 61 as an HTML format file and is displayed on the screen as shown in FIG. 8.

If the user satisfies the displayed read image, he or she can save the selected URL. That is, the web browser 63 has a standard function of "bookmark save" for saving URLs. Therefore, the "bookmark save" can be used to easily save the URL used for the image read.

According to the embodiment thus configured, the following effects are produced:

First, the web server section 46 is installed in the scanner 41 and settings of the scanner 41 can be specified indirectly with a URL input through the web browser 63, so that labor of installing driver software dedicated to each unit as in the conventional art is saved and the scanner 41 can be operated seamlessly under the unified operation environment of the web browser 63.

Particularly, the normal information terminal 61 is provided with the web browser 63 as a substantially standard facility Thus, the user need not get dedicated driver software for installation or learn a driver software operation method. Web pages can be collected smoothly and the scanner 41 can be operated smoothly.

Second, since dedicated driver software varying from one unit to another becomes unnecessary, the memory load and the CPU load of the information terminal can be decreased.

Third, thumbnail images to show prediction of the processing result can be listed on the screen before actual, formal image read is executed, so that desired image data can be gotten efficiently.

Fourthly, since the used URL can be saved, the selected image information input-output unit address and the used setup values can be saved in batch and the next image read can be executed promptly.

Fifthly, the optimum setup values selected for each purpose can be saved in the form of URL elements and when the unit is used next time, the setup values need not be selected again and the unit can be used in the same setting as the preceding time.

Sixthly, if more than one image information input-output unit comprising the web server function according to the invention exists on the network, only the unit address in a URL is changed, whereby the corresponding image information input-output unit can be used to perform processing in the same setting as the preceding time.

Seventhly, since the read retrieval means, a substantially standard facility of the information terminal, can be used to operate the image information input-output unit, the image information input-output unit can be operated immediately unlike the method of sending driver software to the information terminal as required.

2. SECOND EMBODIMENT

Next, a second embodiment of the invention will be discussed with reference to FIGS. 9–12. Parts identical with those previously described with reference to FIG. 3 are denoted by the same reference numerals in FIG. 9 and will not be discussed again. The second embodiment is characterized by the fact that the invention is applied to a printer as an image information input-output unit.

2-1 Functional Configuration of Printer

A printer 71 according to the embodiment comprises a network connection section 72, a print engine 73, a drive section control section 74, an image preparation section 75, a setting section 76, and a web server section 77.

The network connection section 72 contains protocols such as TCP/IP and HTTP like the network connection section 42 described in the first embodiment. The print engine 73 is provided for printing on print recording media; for example, an ink jet engine, a laser engine, etc., can be adopted.

The drive section control section 74 controls the operation of the print engine 73. The image preparation section 75 prepares print image data given to the print engine 73. The print engine 73, the drive section control section 74, and the image preparation section 75 make up "image processing section."

The web server section 77 as a "hypertext information retrieval environment" provides a web server function for the printer 71 like the web server section 46 described in the first embodiment. It comprises an HTTP request reception section 78, an HTTP response preparation section 79, a URL interpretation section 80, and a management table 81.

As in the first embodiment, various setup values, such as print resolution, color specification, and halftone algorithm specification, are entered in the management table 81 as "control information" and predetermined URLs are previously related thereto. A URL input through the HTTP request reception section 78, etc., from an information terminal 61 is converted into predetermined setup values by the URL interpretation section 80 as "conversion means" and the setup values are input into the setting section 76. The setting section 76 as "control means" inputs the input setup values into the drive section control section 74, whereby printing is performed under the user-specified print conditions.

2-2 Operation

Figure 10:
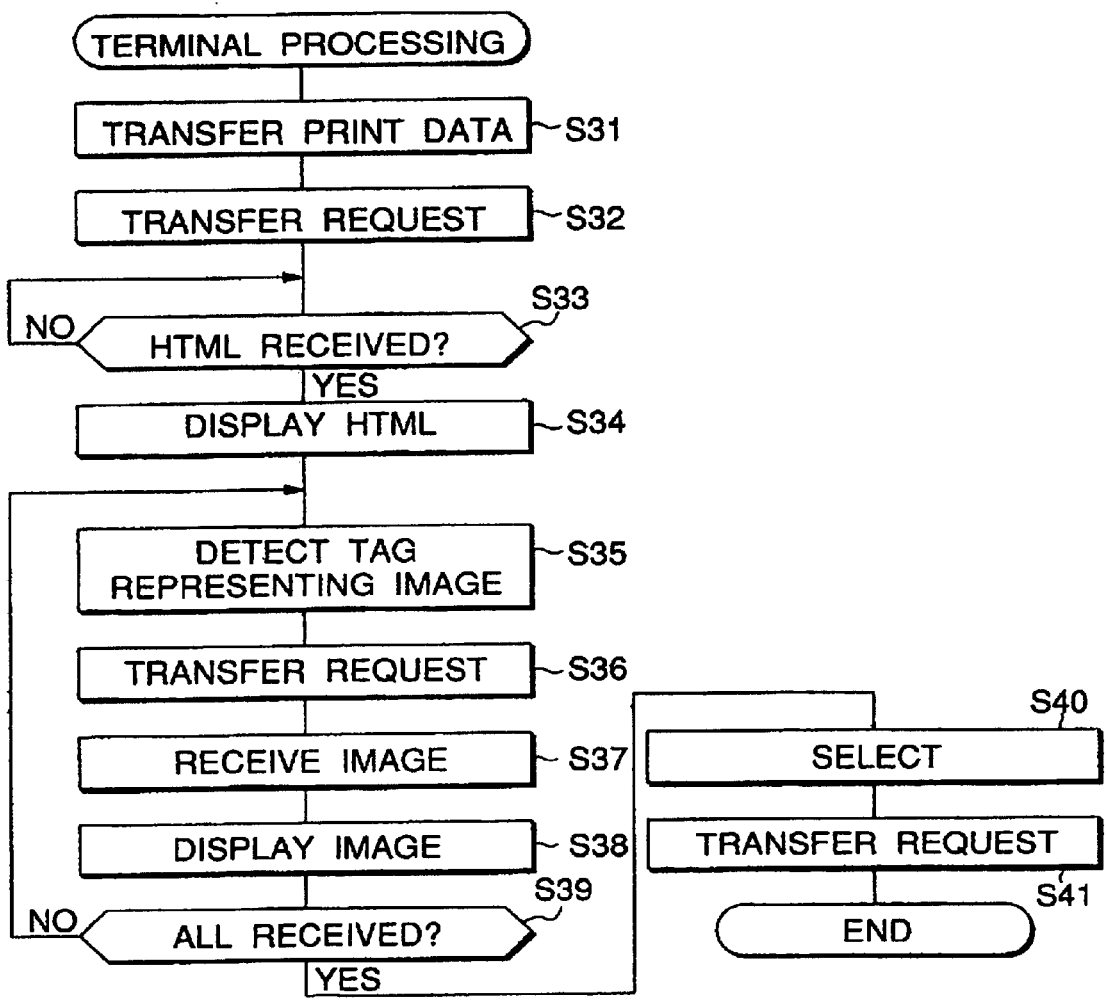
FIG. 10 is a flowchart to show information terminal processing.

Next, the operation of the embodiment will be discussed with reference to FIGS. 10–12. FIG. 10 is a flowchart to show processing of the information terminal 61.

Data to be printed is transferred from the information terminal 61 to the printer 71 at step S31. Specifically, a print file is opened in the web browser 63 and can be transferred to the printer 71 by using a HTTP PUT command, etc. Alternatively, for example, print data may be transferred by using any other means of FTP (File Transfer Protocol), LPR, etc. The LPR refers to a print queue management program called Berkeley line printer demon service and becomes an Internet standard protocol as RFC (Request for Comments) 1179.

Next, an HTTP request is transferred to the printer 71 at step S32. The HTTP request transferred at step S32 is a request for transferring thumbnail images of the print image prediction results, namely, the print prediction results under various print conditions, such as printing of the previously transferred print file at step S31 at 720 dpi, at 360 dpi, in color, and in monochrome.

A wait is made for receiving an HTML format file for thumbnail images from the printer 71 at step S33. If the HTML format file is returned, it is displayed on a screen at step S34, a tag embedded in the HTML format file is detected at step S35, and a request for transferring the thumbnail image file linked by the tag is issued at step S36. This image file transfer request can be made by using a GET command, etc. When the thumbnail image is returned from the printer 71 to the information terminal 61 at step S37, it is displayed on the screen at step S38. The steps S35–S38 are repeated until all thumbnail images are received at step S39.

Figure 12:
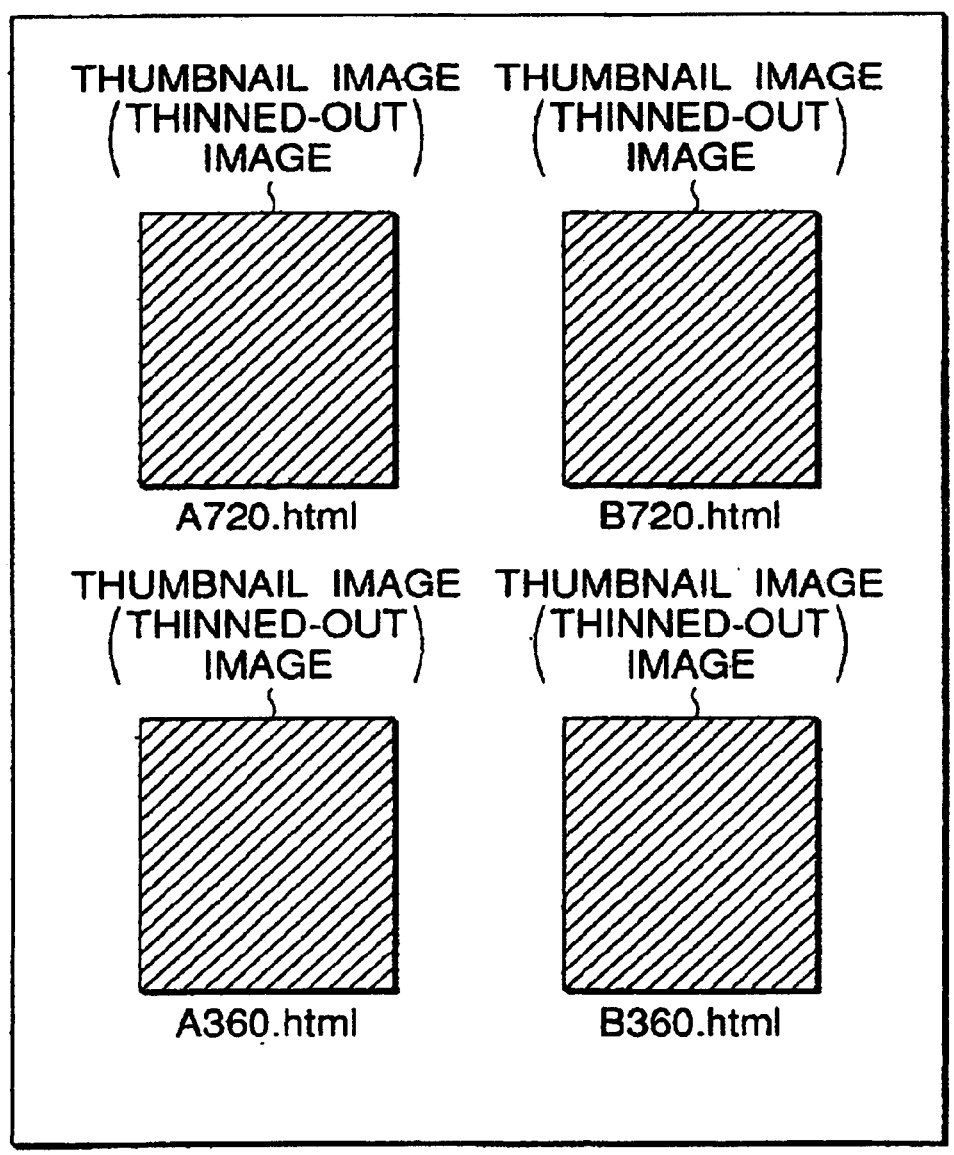
FIG. 12 is a schematic representation of a screen listing thumbnail images of print samples.

When the thumbnail images corresponding to various print settings are displayed as shown in FIG. 12, the user selects the thumbnail image corresponding to any desired print setting with a pointing device, etc., at step S40. When the URL provided in the selected thumbnail image is transferred from the information terminal 61 to the printer 71 at step S41, the printer 71 executes printing.

The steps S31 to S39 in the flowchart shown in FIG. 10 are basically the same as the steps S1 to S9 in the flowchart shown in FIG. 5 except that a print file is transferred at the beginning.

Figure 11:
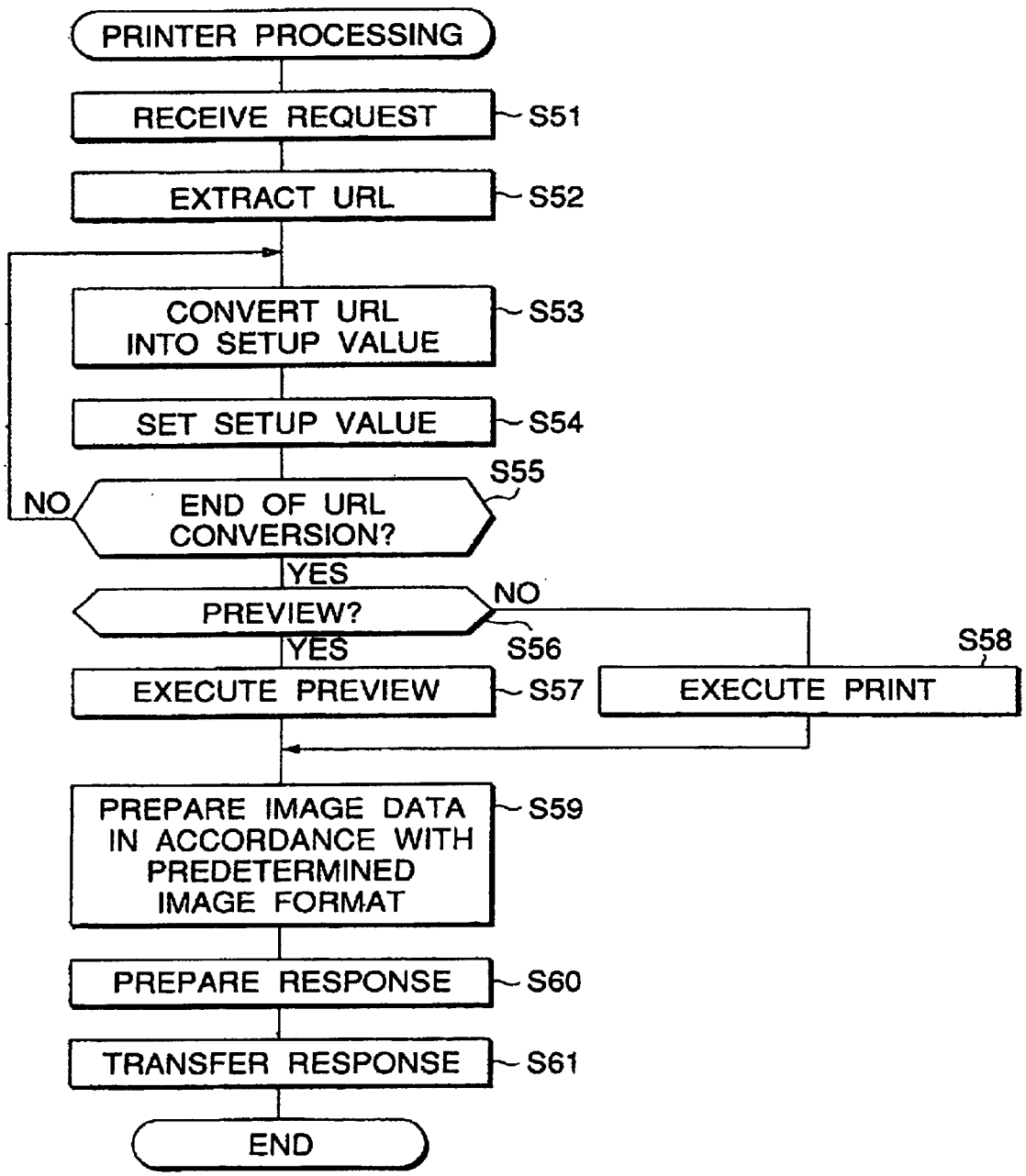
FIG. 11 is a flowchart to show printer processing.

Next, FIG. 11 is a flowchart to show processing of the printer 71. First, when an HTTP request is received from the information terminal 61 at step S51, the URL is extracted at step S52. The URL interpretation section 80 converts an element of the URL into a predetermined setup value at step S53 and the setting section 76 sets the setup value in the drive section control section 74 at step S54. The steps S53 and S54 are repeated until all elements of the URL are converted into setup values at step S55.

Whether or not the request is a preview request for listing thumbnail images is determined at step S56. If the request is a preview request, the image preparation section 75 prepares thumbnail images responsive to various print settings at step S57. Each thumbnail image is converted into image data in a predetermined format of JPEG, GIF, etc., at step S59. The HTTP response preparation section 79 prepares an HTTP response at step S60 and the HTTP response is transferred through the network connection section 72, etc., to the information terminal 61 at step S61.

The decision block at step S56 for determining whether or not the request is a preview request can be omitted. If a request for transferring a list of thumbnail images is made at step S32 in FIG. 10, control can be passed from step S51 in FIG. 11 to step S57 by skipping steps S52–S56.

On the other hand, if a request for print execution is indirectly made with URL, printing is executed based on the specified setup values at step S58.

The embodiment thus configured can also produce the effects similar to those of the first embodiment described above.

3. THIRD EMBODIMENT

Figure 13:
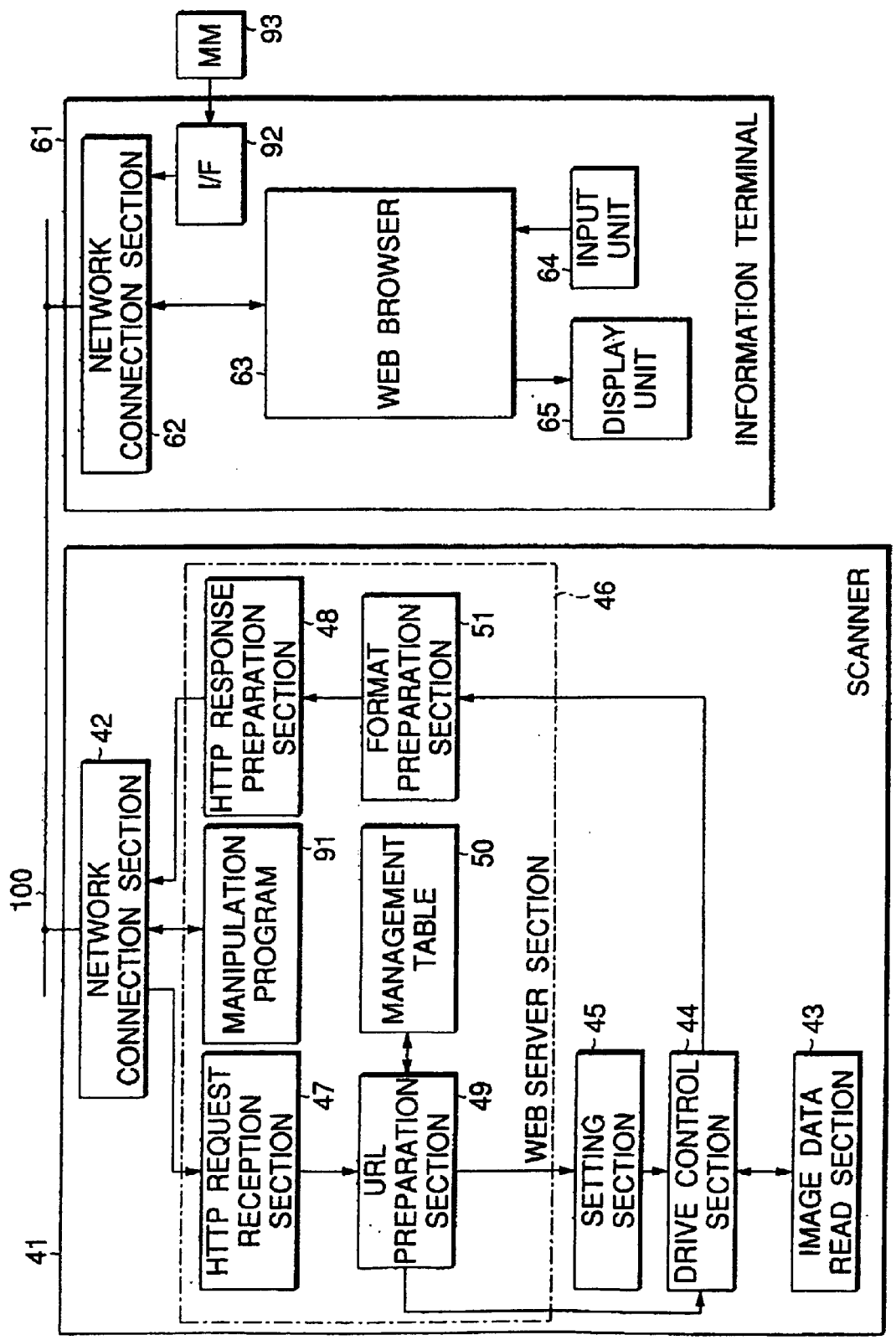
FIG. 13 is a block diagram of an image information processing system according to a third embodiment of the invention applied to a scanner.
Figure 14:
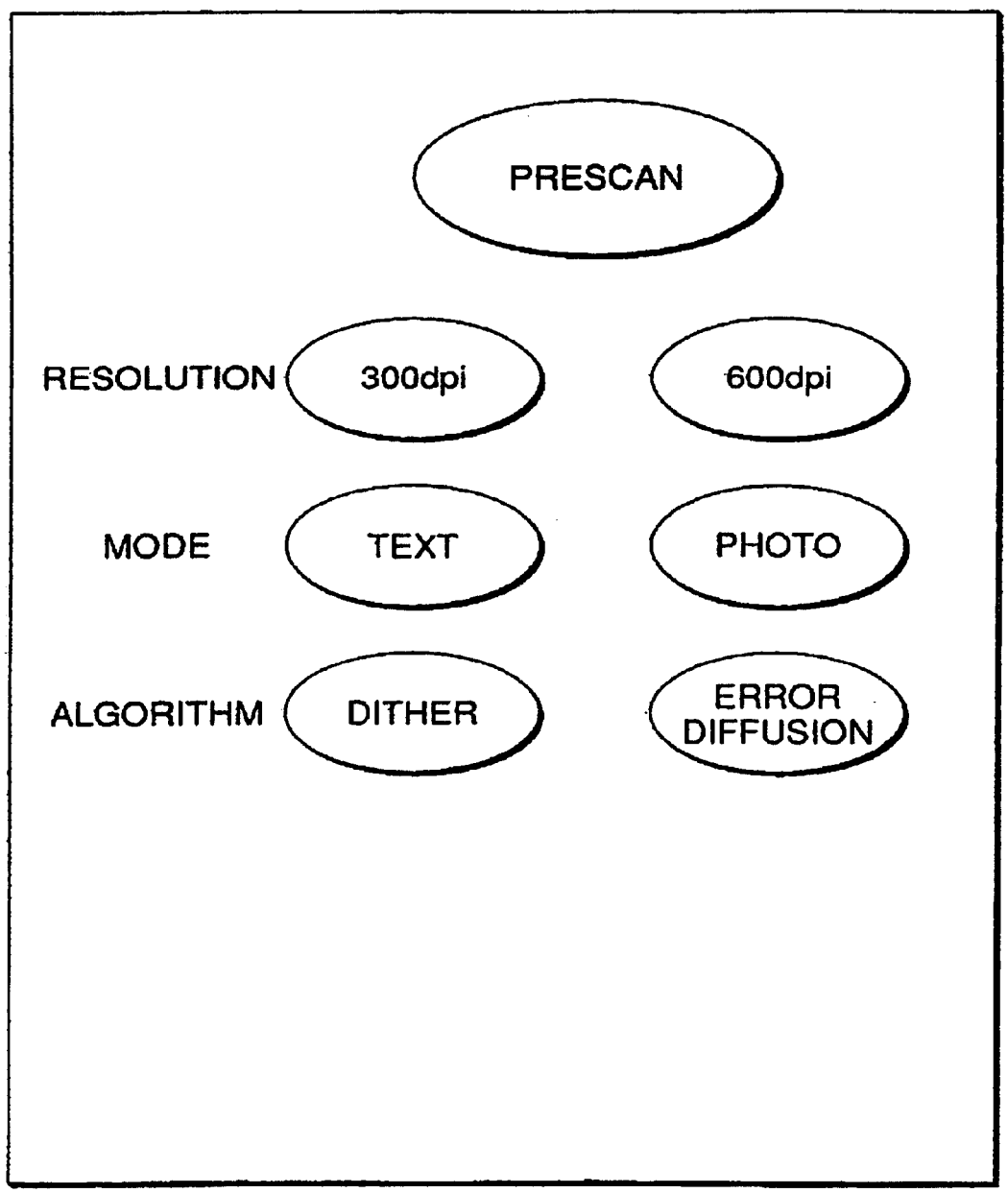
FIG. 14 is a schematic representation to show a screen of a URL input environment constructed in a web browser by a manipulation program.
Figure 15:
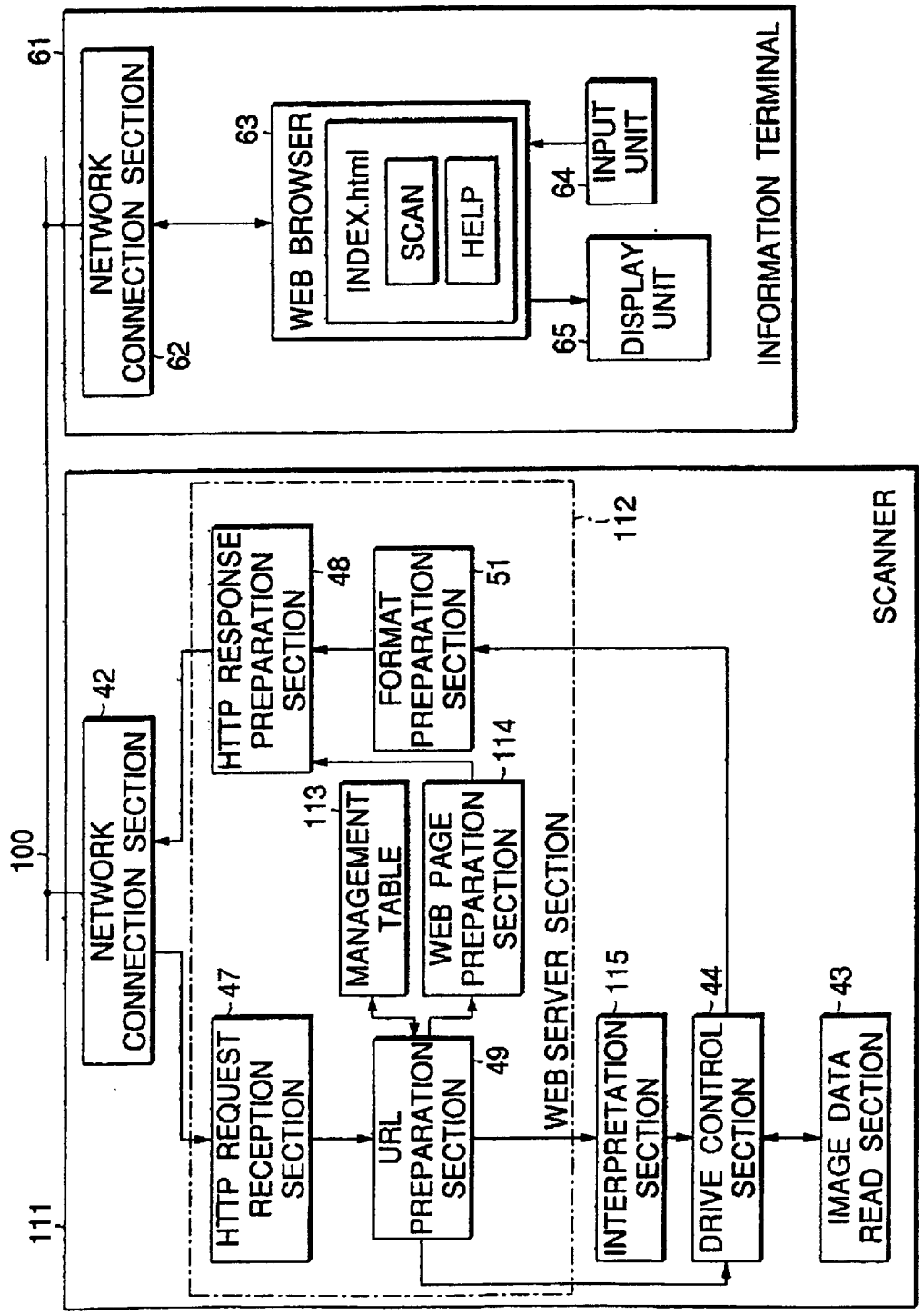
FIG. 15 is a block diagram of an image information processing system according to a fourth embodiment of the invention applied to a scanner.

FIGS. 13 and 14 show a third embodiment of the invention. Parts identical with those previously described with reference to FIG. 3 are denoted by the same reference numerals in FIG. 13 and will not be discussed again. The third embodiment is characterized by the fact that a web server section 46 is provided with a simple input environment construction program of URLs.

A manipulation program 91 is installed in the web server section 46. The manipulation program 91 is prepared as an architecture-neutral program that can be executed with a web browser 63, such as a Java program (applet) developed by Sun Microsystems USA.

The manipulation program 91 is downloaded into an information terminal 61 from the web server section 46, whereby an operation environment, a URL input environment as shown in FIG. 14 can be provided. The user can easily enter even a URL not yet entered in Bookmark by handling the button corresponding to each setup value with a pointing device, etc.

4. FOURTH EMBODIMENT

Next, a fourth embodiment of the invention will be discussed with reference to FIGS. 15–18. Parts identical with those previously described with reference to FIG. 3 are denoted by the same reference numerals in FIG. 15 and will not be discussed again. The fourth embodiment is characterized by the fact that a web page is provided by a web server function of an image information input-output unit and the processing contents are selected and verified through the web page.

4-1 Configuration

A scanner 111 as an image information input-output unit comprises a web server section 112, an interpretation section 115, a drive control section 44, and an image data read section 43. The web server section 112 includes a web page preparation section 114 as "web page preparation means" for preparing a predetermined web page in response to a URL as input "resource request information" and transmitting the web page to an information terminal 61.

A URL interpretation section 49 converts an input URL into a control command, etc., based on a management table 113. The control command is input to and interpreted by the interpretation section 115.

Figure 16:
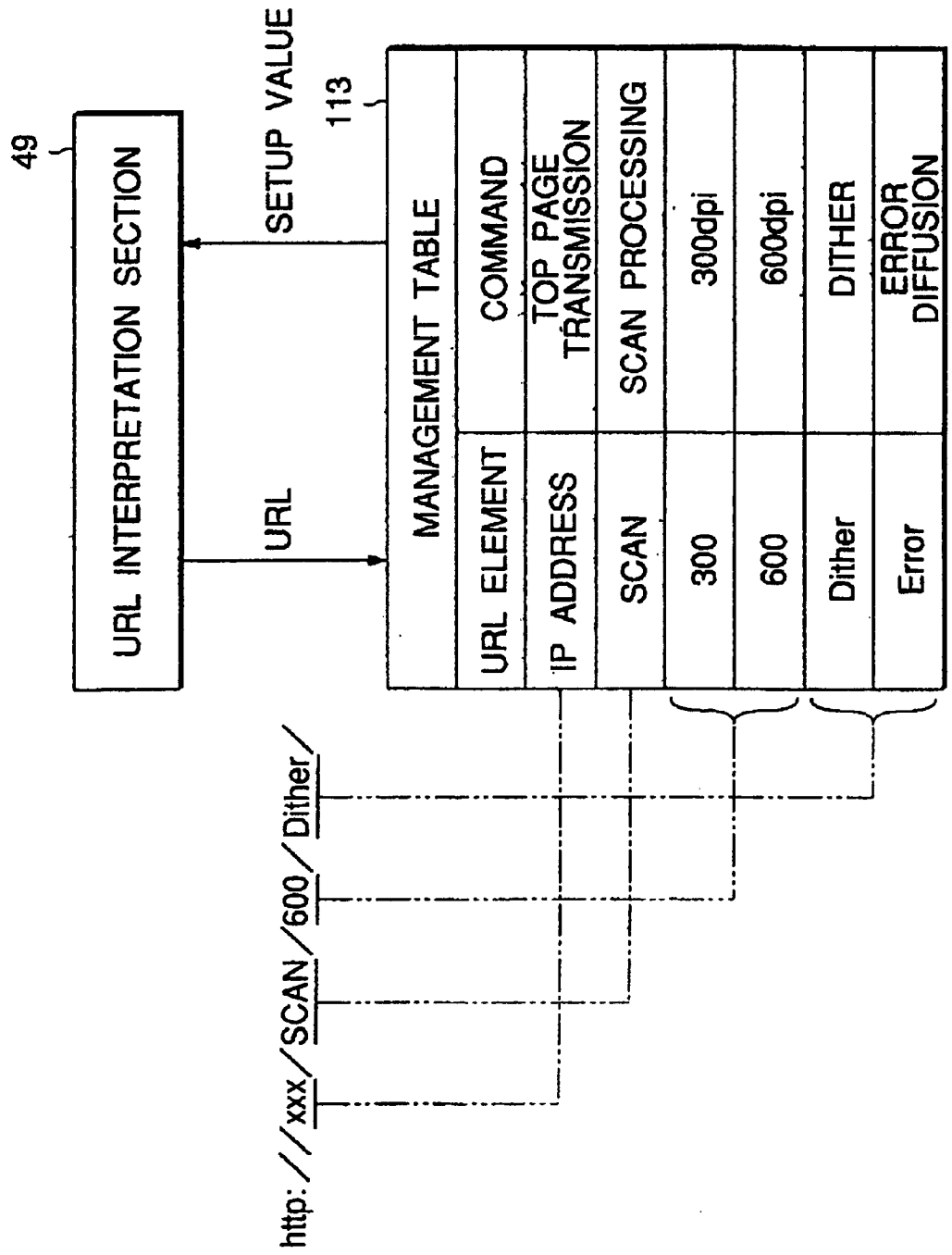
FIG. 16 is a schematic representation to show the format of a management table, etc.

The management table 113 can be formed as shown in FIG. 16. For example, the IP address of the scanner 111 is related to a command for transmitting the preset top web page. As described later, if only the IP address is entered, a top menu page, such as INDEX.html, is transferred to the information terminal 61. In the management table 113, SCAN is related to a command indicating scan processing, 300 is related to read resolution 300 dpi, 600 is related to read resolution 600 dip, Dither is related to dither processing, and Error is related to an error diffusion method for storage. FIG. 16 shows some of example control commands, etc., and the invention is not limited to them.

4-2 Operation

Figure 17:
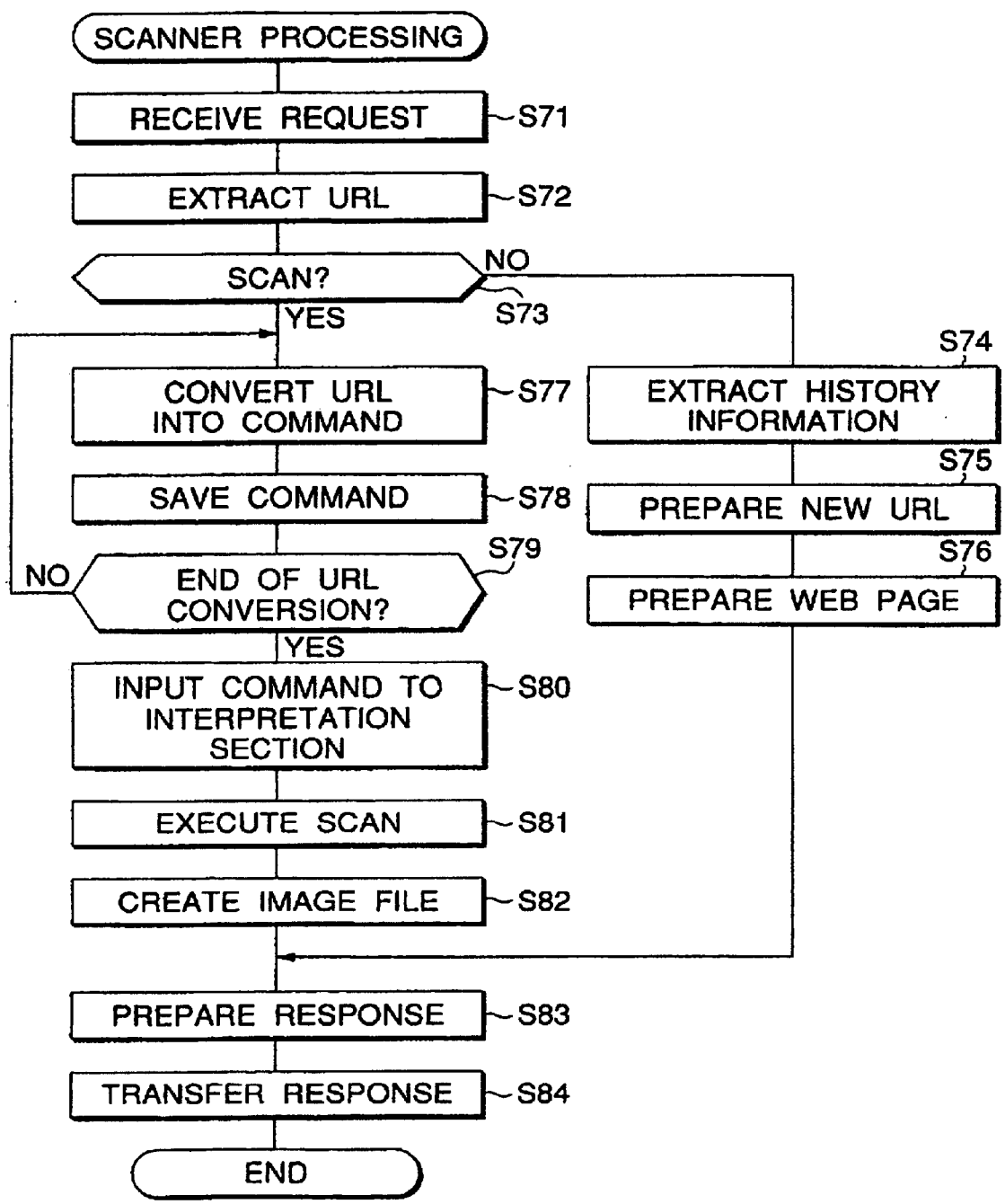
FIG. 17 is a flowchart to show scanner processing.

Next, the operation of the embodiment will be discussed with reference to FIGS. 17 and 18. First, when an HTTP request is received from the information terminal 61 at step S71, a URL is extracted from the received request at step S72. Next, whether or not scan is to be executed is determined at step S73. For example, if the input URL contains a scan execution command or if all required for scan execution are selected, it can be determined that scan is to be executed.

If scan is not executed, NO is returned at step S73 and the structure of the input URL is analyzed and history information is extracted at step S74. A history of selecting various parameters of resolution, halftone processing method, etc., is detected as described later. A new URL is prepared so as to contain the detected history information at step S75 and is related to a web page at step S76. The web page thus prepared is transmitted to the information terminal 61 at steps S83 and S84.

On the other hand, if it is determined at step S73 that scan is to be executed, input URLs are converted into control commands in order starting at the top URL at step S77 and the control commands are saved in a buffer at step S78. If all URLs are converted into the control commands at step S79, the control commands are passed to the interpretation section 115 at step S80 and scan is executed at step S81. The image provided as a result of the scan is prepared as an image file in a predetermined format at step S82 and is transmitted to the information terminal 61 as a part or all of the web page at step S83 and S84.

Figure 18:
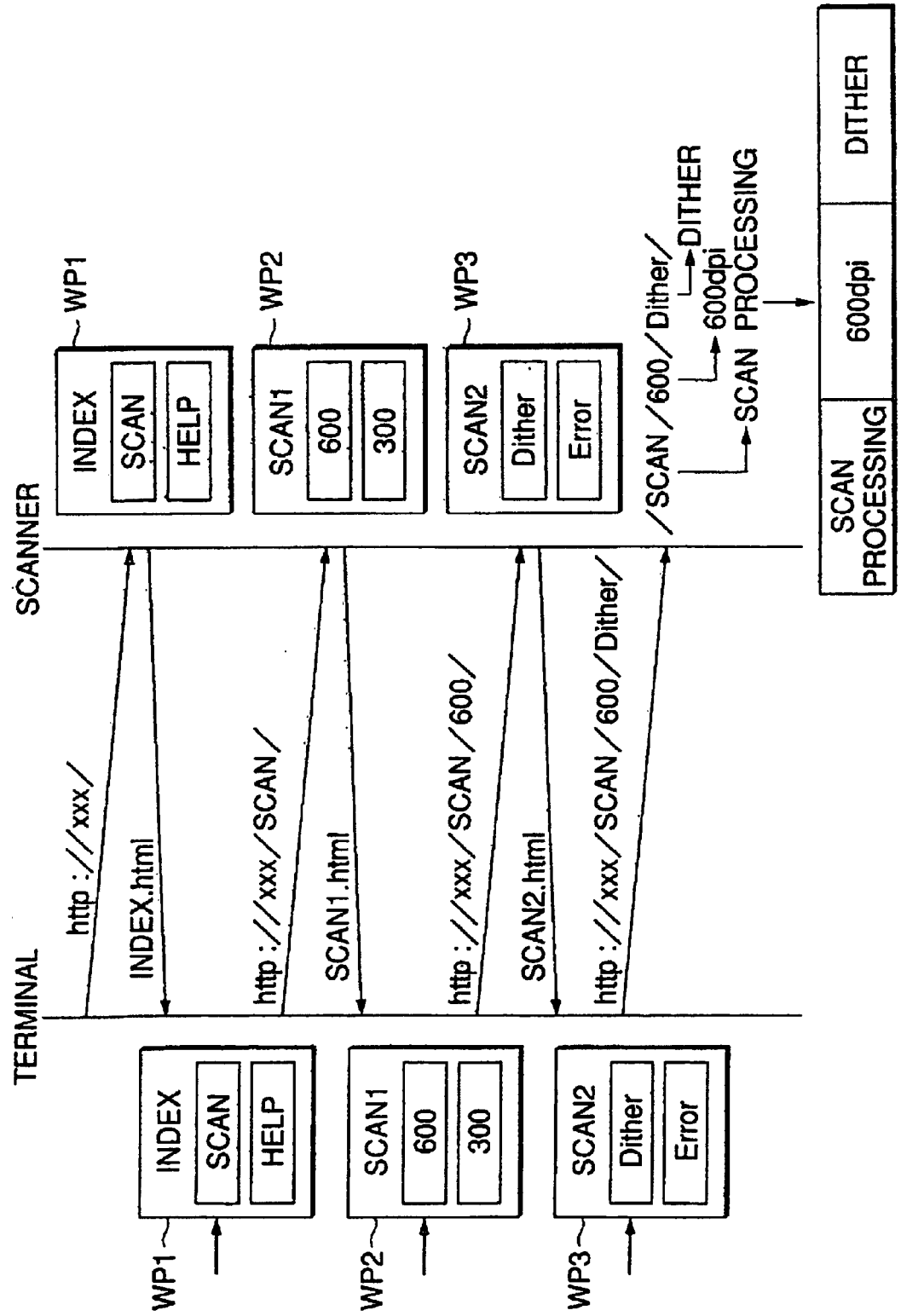
FIG. 18 is a schematic representation to show transmission of web pages and URLs, etc.

FIG. 18 shows schematically how the information terminal 61 and the scanner 111 communicate with each other.

First, a URL containing only the IP address of the scanner is sent from the information terminal 61 to the scanner 111. Since the URL containing only the IP address is related to an index page transmission request, the scanner 111 returns index page WP1 to the information terminal 61. The index page WP1 enables the user to chose a scanner processing screen or a help screen.

If the user selects scanner processing displayed as SCAN on the index page WP1, the URL corresponding to the selected SCAN (http://xxx/SCAN/) is transmitted to the scanner 111. When receiving the transfer request, the scanner 111 prepares the first page of scanner processing, WP2, and returns the page to the information terminal 61. The first page WP2 enables the user to chose read resolution between 600 dpi and 300 dpi.

It must be noted that the scanner 111 analyzes the structure of the received URL, extracts history information, prepares a new URL containing the history information, and prepares the web page WP2. In the example shown in FIG. 18, the history information "SCAN" is extracted from the URL "http://xxx/SCAN/." The URL pasted to the first page WP2 contains the history information. That is, the URL for specifying the read resolution 600 dpi is formed as "http://xxx/SCAN/600/" and the URL for specifying the read resolution 300 dpi is formed as "http://xxx/SCAN/300/."

If the user chooses the read resolution 600 dpi, the URL "http://xxx/SCAN/600/" is sent to the scanner 111. Since choosing of the resolution is followed by choosing of halftone processing in the example in FIG. 18, the scanner 111 prepares halftone processing page WP3 of the next choice menu and returns the page to the history information. The second page WP3 enables the user to chose a processing method between dither processing and error diffusion method. The URL related to the second page WP3 also contains history information. That is, when the second page WP3 is prepared, the history information is "SCAN/600," thus the URL for choosing the dither processing is formed as "http://xxx/SCAN/600/Dither/" and the URL for choosing the error diffusion method is formed as "http://xxx/SCAN/600/Error/."

Therefore, for example, if the user chooses the dither processing, the URL "http://xxx/SCAN/600/Dither/" containing all the choice history is sent to the scanner 111, which then converts the URL into control command and inputs the control command to the interpretation section 115 for executing the requested scan processing.

The URL representation method is not limited to the above-given example. For example, a form of "http://xxx/action=SCAN/resolution=600/algorithm=Dither/" may be adopted. That is, the information indicating the parameter types (action, resolution, and algorithm) and the parameter values (SCAN, 600, and Dither) are represented in a set, whereby the processing contents can be clearly understood simply by seeing the URL.

The embodiment thus configured can also produce similar effects to those of the above-described embodiments because the control command is indirectly specified through the URL.

In addition, the fourth embodiment produces the following effects:

First, the scanner 111 prepares each web page and returns the page to the information terminal 61, thus the user can cause the scanner 111 to perform any desired operation simply by choosing the URL in the web page. That is, the web pages display predetermined processing items of read resolution, halftone processing method, etc., to which predetermined URLs are related in a one-to-one correspondence with each other, so that the user may chose any desired processing item and need not manually enter any complicated URL. Therefore, misoperation is prevented and ease of use can be enhanced.

Second, the URL contains history information of the processing items chosen in the past. Thus, storing of the URL history in the web server as in embodiments described later is not required and memory consumption, etc., can be saved.

The initial or default values of parameters are preset, whereby scan processing can also be performed without selecting all parameters.

5. FIFTH EMBODIMENT

Next, a fifth embodiment of the invention will be discussed with reference to FIG. 19. The fifth embodiment is characterized by the fact that executable processing patterns are previously listed on a web page for scan processing.

Figure 19:
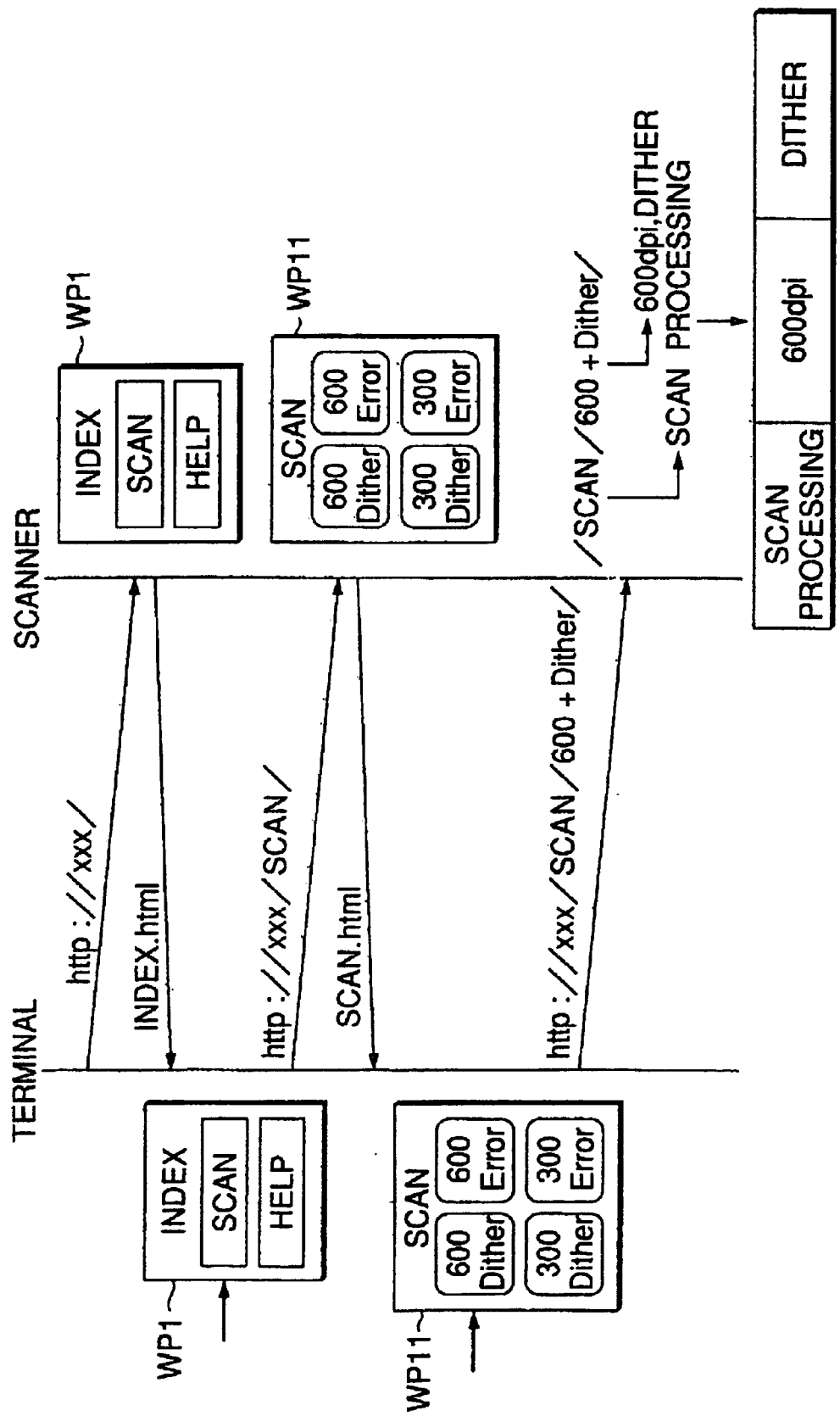
FIG. 19 is a schematic representation to show transmission of web pages and URLs, etc., in an image information processing system according to a fifth embodiment of the invention.

FIG. 19 shows schematically how the information terminal 61 and the scanner 111 communicate with each other in the embodiment. If the user selects scanner processing out of an index page WP1, a scanner 111 prepares a scanner processing menu page WP11 and returns the page to an information terminal 61. The web page WP11 lists all executable processing patterns in the scanner 111.

That is, the web page W11 displays four processing patterns provided by combining two read resolutions of 600 dpi and 300 dpi and two halftone processing methods of dither processing and error diffusion method. URLs containing information for carrying out the processing patterns are related to the processing patterns in a one-to-one correspondence with each other. For example, a URL of "http://xxx/SCN/600+Dither/" is related to a processing pattern for performing dither processing at read resolution 600 dpi and a URL of "http://xxx/SCN/300+Error/" is related to a processing pattern for executing the error diffusion method at read resolution 300 dpi.

Therefore, if the user selects any desired processing pattern out of the web page, the URL related to the processing pattern is sent to the scanner 111 and is converted into a predetermined command for performing scan processing.

The embodiment thus configured can also produce similar effects to those of the fourth embodiment. In addition, the processing patterns are previously listed in the fifth embodiment, it is not necessary to follow the web page hierarchy for selecting a desired processing pattern; ease of use is enhanced.

The fourth and fifth embodiments can also be combined. That is, principal parameters of read resolution, etc., are displayed as a processing pattern list and other parameters are selected out of a web page at a lower level.

6. SIXTH EMBODIMENT

Next, a sixth embodiment of the invention will be discussed with reference to FIGS. 20–22. The sixth embodiment is characterized by the fact that a management server is provided for managing business machines such as a scanner and a printer connected to a network.

6-1 Configuration

Figure 20:
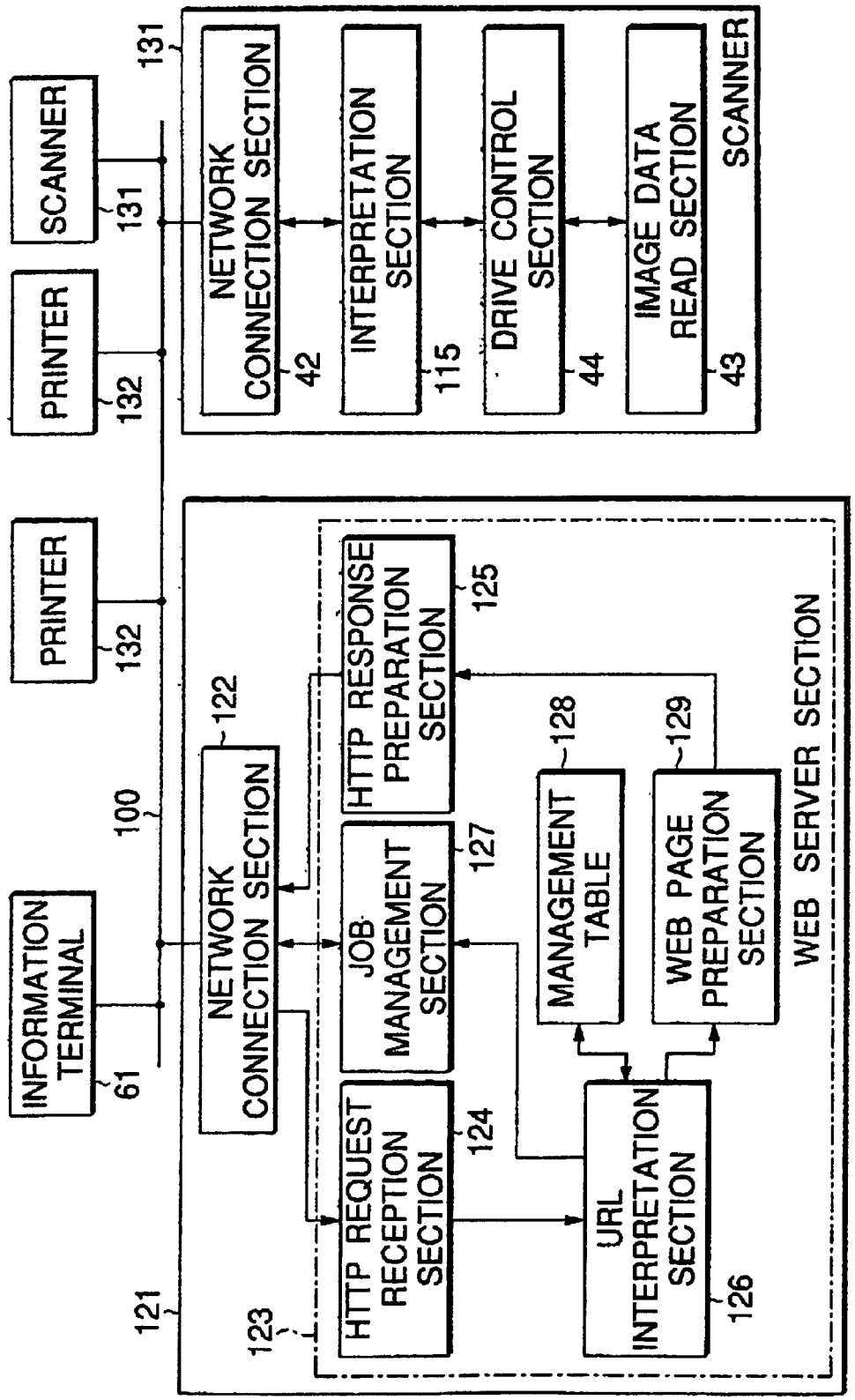
FIG. 20 is a block diagram to show an image information processing system according to a sixth embodiment of the invention.

FIG. 20 is a block diagram to show the whole configuration of an image information processing system according to the embodiment. A management server 121 comprises a network connection section 122 for connecting the management server to a network 100 and a web server section 123 which comprises an HTTP request reception section 124, an HTTP response preparation section 125, a URL interpretation section 126, a job management section 127, a management table 128, and a web page preparation section 129.

The management table 128 is provided for managing URLs, control commands, etc., in correspondence with each other. It stores control commands of both scanners 131 and printers 132. The web page preparation section 129 prepares a predetermined web page and transmits the page to an information terminal 61, as described later.

The URL interpretation section 126 converts a URL received from the information terminal 61 into a control command based on the management table 128. The control command is transmitted from the job management section 127 through the network connection section 122 to a predetermined business machine. The job management section 127 that can be represented as job management means, for example, keeps track of the operation state, etc., of each business machine connected to the network 100.

Each scanner 131 comprises a network connection section 42, an interpretation section 115, a drive control section 44, and an image data read section 43. That is, the scanner 131 need not have a web server function. Likewise, each printer 132 comprises a network connection section, a reception buffer, an interpretation section, a print engine, etc., like a normal network printer.

6-2 Operation

Figure 21:
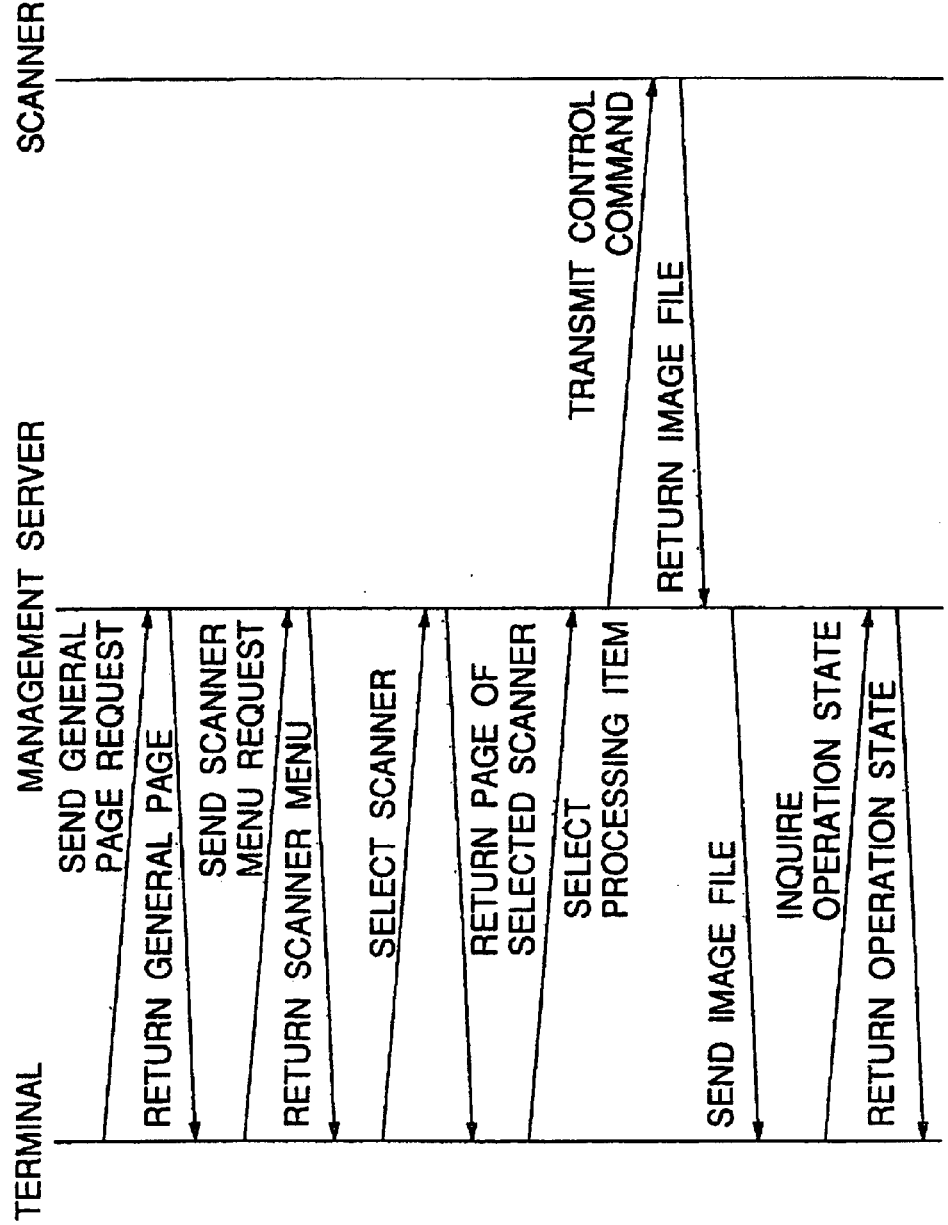
FIG. 21 is a schematic representation to show schematically a communication state among an information terminal, a management server, and a scanner.

FIG. 21 shows schematically how communication is executed among the information terminal 61, the management server 121, and the scanner 121.

First, when the information terminal 61 requests the web server section 123 of the management server 121 to transfer a general page WP21, the management server 121 returns the general page WP21 to the information terminal 61. The general page WP21 is a page indicating the business machines connected to the network 100 for each type, such as scanners and printers, as shown in FIG. 22.

If the user selects a scanner menu WP22 out of the general page WP21, the management server 121 returns the scanner menu WP22 to the information terminal 61. As shown in FIG. 22, the names, etc., of the scanners connected to the network 100 are displayed on the scanner menu WP22. If the user selects any desired scanner 131, the management server 121 returns an operation menu WP23 of the selected scanner 131 to the information terminal 61. As shown in FIG. 22, a parameter selection button for scan processing and an inquiry button about the operation state, etc., are displayed on the operation menu WP23. If scan processing is chosen, parameters can be selected out of one or more web pages as in the example shown in FIG. 18.

Figure 22:
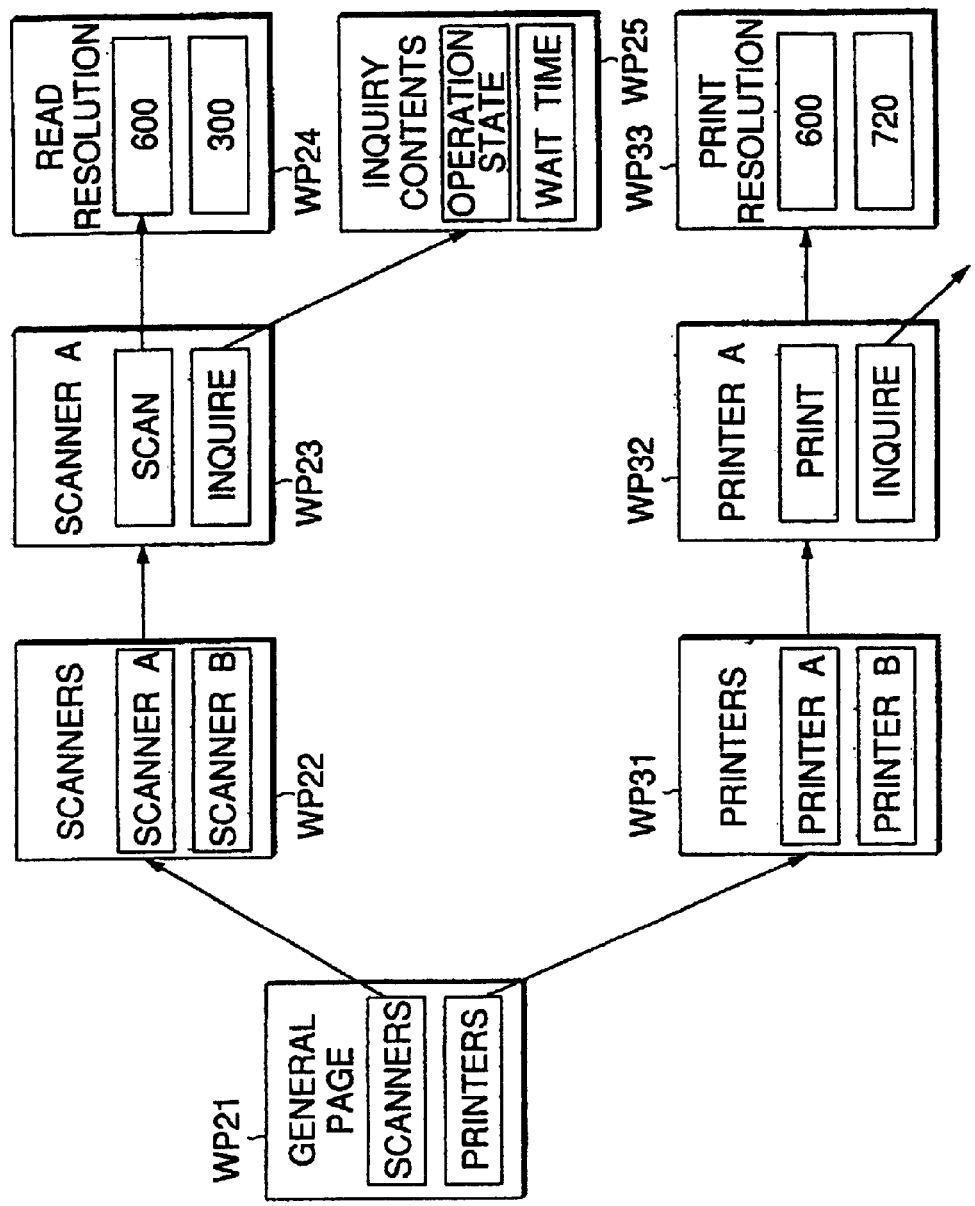
FIG. 22 is a schematic representation to show a hierarchical structure of web pages.

If the user chooses a desired parameter out of a read resolution choice page WP24 shown in FIG. 22, a URL indicating the parameter is sent to the management server 121. The URL interpretation section 126 of the management server 121 converts the received URL into a predetermined control command. The control command is transmitted to a predetermined scanner 131, which then interprets the control command, executes scan processing, and transfers an image file provided by scanning to the management server 121, which then transfers the image file received from the scanner 131 to the information terminal 61.

On the other hand, to inquire the operation state, etc., of the scanner 131 or the printer 132, the user chooses the "INQUIRE" out of the operation menu WP23, whereby the job management section 127 of the management server 121 returns the operation state, etc., of the specified machine to the information terminal 61. That is, management data such as the number of jobs assigned to the specified machine and the job size, the wait time prediction value, and the like are sent to the information terminal 61. Although the scanner 131 is taken as an example in FIG. 21, the printer 132 is also provided with web pages WP31–WP33, as shown in FIG. 22.

The embodiment can also produce similar effects to those of the fourth embodiment because the control command of each machine can be indirectly specified through the URL. In addition, the sixth embodiment provides the management server 121 for managing the scanners 131 and the printers 132 and desired URLs are input from the web pages provided by the management server 121, whereby the machines are operated. Thus, normal network printers and network scanners can be easily operated through the web browser and further the user can keep track of the operation state, the wait time, etc., of each machine.

The web server section may also be installed in each machine of the scanners 131 and the printers 132 so as to execute HTTP communication among the machines 131, 132, the management server 121, and the information terminal 61. In this case, the management server 121 can be made to serve as a proxy server.

7. SEVENTH EMBODIMENT

Next, a seventh embodiment of the invention will be discussed with reference to FIG. 23. The seventh embodiment is characterized by the fact that whenever a processing item is selected, prescan is executed and an image file provided by the prescan is returned to an information terminal as a web page.

Figure 23:
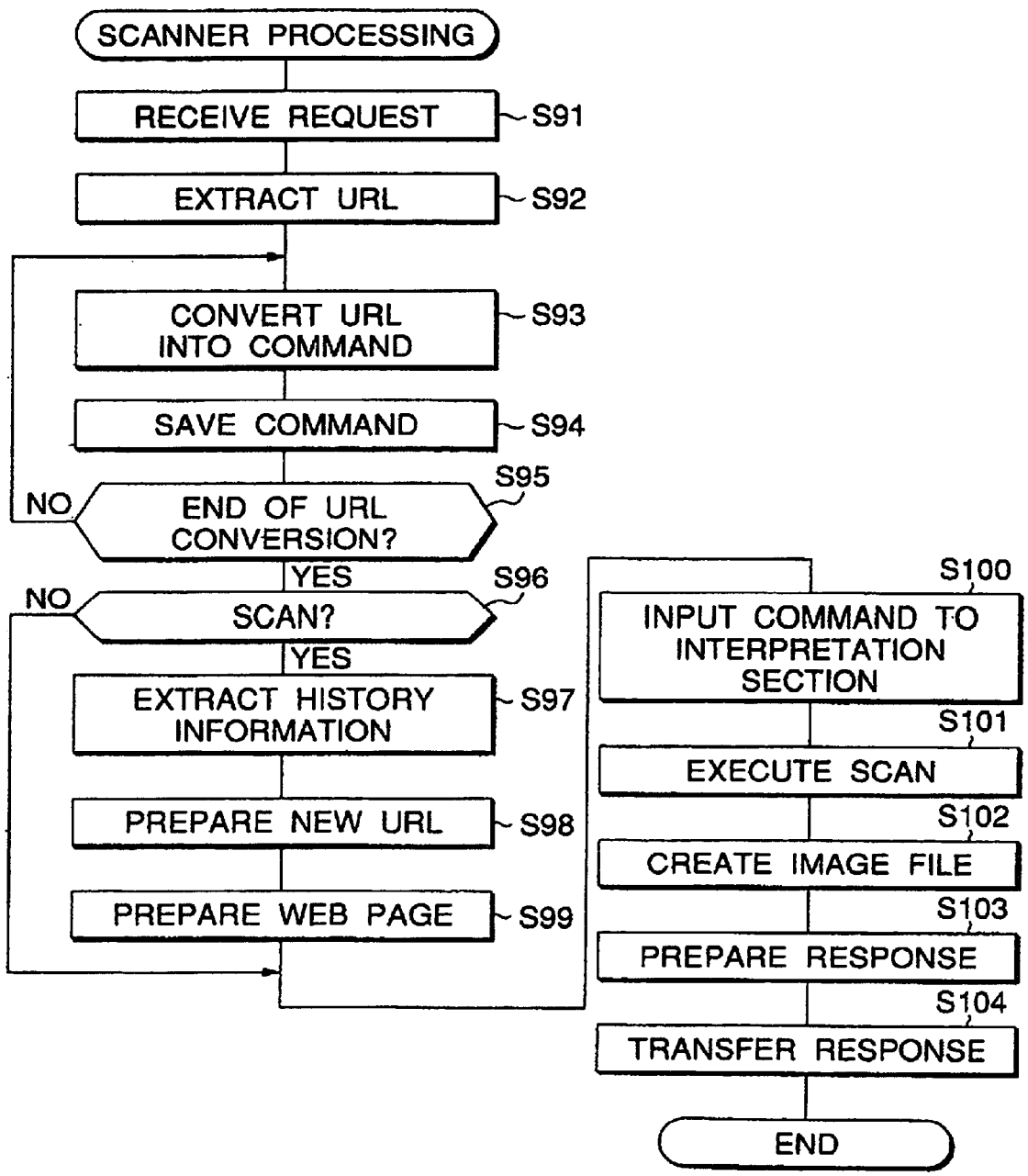
FIG. 23 is a flowchart to show scanner processing in an image information processing system according to a seventh embodiment of the invention.

Scanner processing according to the seventh embodiment is shown on a flowchart of FIG. 23.

When an HTTP request is received from an information terminal 61 at step S91, URLs are extracted at step S92. The extracted URLs are converted into control commands in order starting at the top at step S93 and the control commands are saved in a buffer at step S94 until completion of the URL conversion at step S95. Whether or not prescan is to be executed is determined at step S96. For example, a scan start button is provided in a web page and if the scan start button is not operated, it can be determined that prescan is to be executed.

If it is determined that prescan is to be executed, history information is extracted from the input URL at step S97, a new URL is prepared at step S98, and a web page to which the new URL is related is prepared at step S99. The control command based on the input URL is input to the interpretation section 115 as step S100 and scan is executed at step S101. The scan at step S101 becomes prescan. Even if the user does not specify all parameters, prescan can be executed. That is, the initial (default) values of the parameters are preset and if the user omit some parameters, the initial (default) values of the parameters are assumed to be specified for executing prescan.

The image provided by the prescan is prepared as a predetermined image file at step S102 and an HTTP response is prepared at step S103 and is returned to the information terminal 61 at step S104. The URL specifying the prescan image file is contained in the web page prepared at step S99. Therefore, whenever the user selects a parameter of read resolution, etc., a prescan image can be provided based on the selection result.

On the other hand, it is determined that scan is to be executed as the scan start button is operated, etc., steps S97–S99 are skipped and control goes to step S100.

The embodiment thus configured can also produce similar effects to those of the fourth embodiment. In addition, in the seventh embodiment, prescan is executed each time a parameter of read resolution, etc., is selected, prescan is executed, so that the user can select a parameter while checking the processing result.

8. EIGHTH EMBODIMENT

Next, an eighth embodiment of the invention will be discussed with reference to FIG. 24. The eighth embodiment is characterized by the fact that a history of selected processing items is saved in a scanner.

Figure 24:
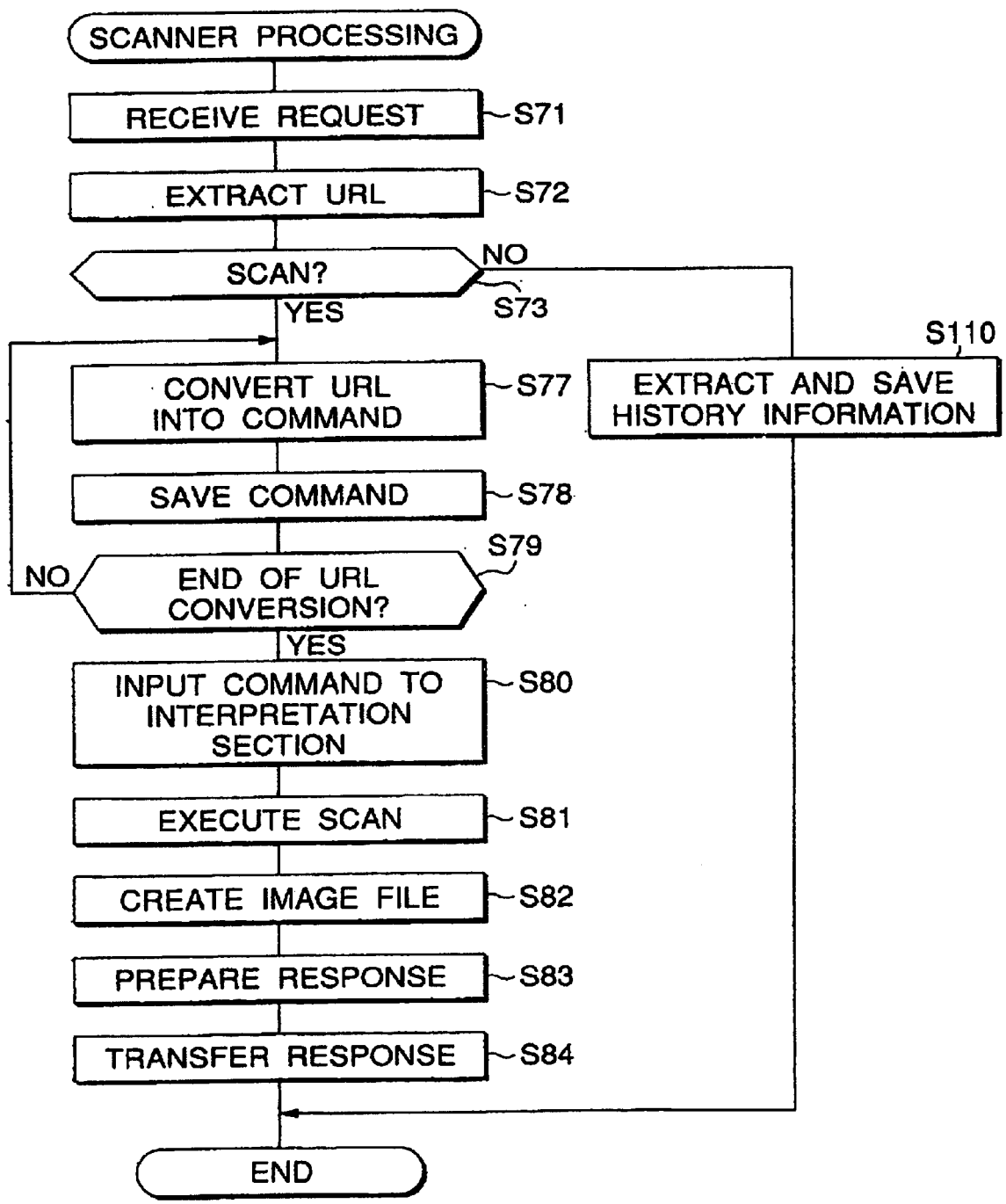
FIG. 24 is a flowchart to show scanner processing in an image information processing system according to an eighth embodiment of the invention.

Scanner processing according to the embodiment is shown on a flowchart of FIG. 24. It contains steps S71–S73 and S77–S84 shown in FIG. 17.

In the embodiment, if it is determined at step S73 that scan is not to be executed, the processing items selected with URLs are extracted and are saved in a buffer at step S110.

That is, the processing items indicated by the URLs are temporarily saved in the buffer and if it is determined that scan is to be executed, the saved processing items are converted into a control command at steps S77–S79. For example, if a URL of "http://xxx/300/" is input, the "/300/" part is saved. Next, if a URL of "http://xxx/Error/" is input, the "/Error/" part is saved. To execute scan, the saved URL parts are converted into a control command, which then is input to an interpretation section 115.

Therefore, the embodiment eliminates the need for generating a new URL containing history information of input URLs for preparing web pages.

The embodiment thus configured can also produce similar effects to those of the fourth embodiment.

9. NINTH EMBODIMENT

Next, a ninth embodiment of the invention will be discussed with reference to FIG. 25. The ninth embodiment is characterized by the fact that an information terminal monitors a URL selection history and transfers a URL containing the selection history in response to a request made by a web server section of a machine.

Figure 25:
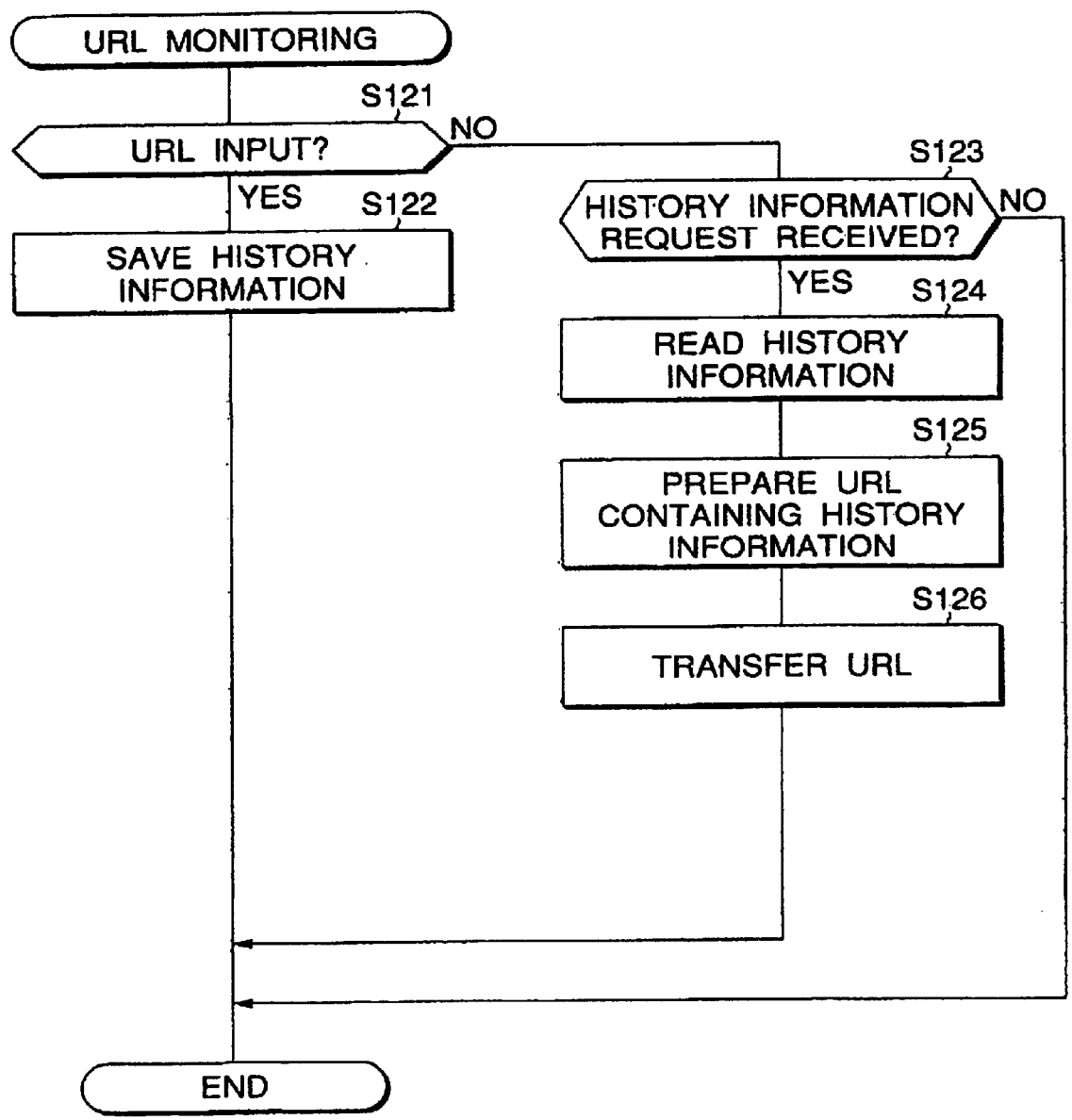
FIG. 25 is a flowchart to show URL monitor processing in an image information processing system according to a ninth embodiment of the invention.

FIG. 25 is a flowchart to show URL monitoring executed by an information terminal 61. For example, when the information terminal 61 first accesses a scanner 111, the monitoring program can be sent from the scanner 111 to the information terminal 61 and can be started in the information terminal 61.

First, the information terminal 61 monitors input of a URL at step S121. If a URL is entered, history information of the URL is saved in a memory of the information terminal 61 at step S122. That is, for example, if the user of the information terminal 61 enters a URL of "http://xxx/600," the "/600/" part is saved. Each time a URL is entered, it is stored in the information terminal 61.

On the other hand, no URL is entered, whether or not a history information transfer request is received from a web server section 112 of the scanner 111 is determined at step S123. If a history information transfer request is received, the saved history information is read at step S124, a new URL containing all the selection contents is prepared at step S125 and is transferred to the scanner 111 at step S126. At step S122, all of the URL rather than a part thereof may be saved.

The embodiment thus configured can also produce similar effects to those of the fourth embodiment. In addition, the information terminal 61 monitors URL selection history and last transmits the URL containing all the selection history to the scanner 111, thus memory and CPU resource consumption of the scanner can be saved.

It is further understood by those skilled in the art that the foregoing description is preferred embodiments of the disclosed system and that various changes and modifications may be made in the invention without departing from the spirit and scope thereof.

For example, as shown in FIG. 13, a program, etc., for embodying the invention is stored on a recording medium 93 and the storage contents of the recording medium 93 can be loaded into the scanner 41 through an I/F 92 and the information terminal 61. A predetermined program can also be downloaded directly into the scanner 41. In addition to a physical recording media, such as floppy disk, CD-ROM, DVD-ROM, and memory card, a communication medium using a communication line for downloading is available as the recording medium 93.

Further, a password or a personal identification number required for accessing the image information input-output unit is provided so that only the persons who have access to the image information input-output unit can operate the image information input-output unit.

If the web server section is provided with an HTML format file for displaying image information input-output unit status information, such as the fed paper size and the remaining toner amount, the image information input-output unit status can be easily checked from the information terminal. Appropriate HTML format files for displaying manuals and an error recovery procedure (troubleshooting) can also be sent to the information terminal as required in response to the status. That is, only required online manuals can also be read on the information terminal in response to the status of the installed option type such as a double-sided printing mechanism, the printing paper type, etc.

Further, in the embodiments, two types of image information input-output units of scanner and printers have been taken as examples, but the invention is not limited to them. For example, the invention can also be applied widely to various image information input-output units, such as digital still-video cameras, digital video cameras, and liquid crystal displays. For example, for the digital still-video cameras, the digital video cameras, etc., the setup values of the shutter speed, exposure, the image type of still or moving image, voice input option, etc., can be specified indirectly through the read retrieval means such as the web browser. For the liquid crystal displays, the setup values of display resolution, gradation, etc., can be handled indirectly through the web browser.

As we have discussed, according to the image information input-output unit, control information to control the operation of the image processing means can be specified indirectly by retrieval information or command information, thus it is not necessary to install dedicated driver software, etc., in the information terminal, and the image information input-output unit can be operated seamlessly under the unified operation environment.

Particularly, the hypertext information retrieval environment is installed in the image information input-output unit and retrieval information to use the information retrieval environment can be used to indirectly specify control information, thus a new program need not be installed in the information terminal and operability can be improved. Therefore, the user need not learn the use method of a control program such as driver software. The memory capacity mounted in the information terminal can be decreased.

Further, control information is specified indirectly by resource request information containing history information of selected processing items, thus neither the information terminal nor the image information input-output unit needs to hold the processing item selection history and the system configuration can be simplified.

What is claimed is:

1. An image information input-output unit comprising:
   a hypertext information retrieval environment;
   image processing means for processing of image information based on a control information;
   management means for managing an URL information, which is recordable in the hypertext information retrieval environment, and said control information in correspondence with each other, said URL information having a function of designating a plural of setting values simultaneously;

conversion means for looking up in said management means based on the entered URL information and converting the URL information into the predetermined control information; and control means for controlling operation of said image processing means based on the control information into which the retrieval information is converted by said conversion means.

2. The image information input-output unit as claimed in claim 1, wherein said management means relates a sample image generation request to predetermined retrieval information for managing them, and wherein said information retrieving means comprises:

sample image generation means for generating prediction results of image information input-output processing based on a plurality of preset control information pieces as sample images if the sample image generation request occurs as the predetermined retrieval information is entered;

sample image list information generation means for generating sample image list information for relating the retrieval information pieces corresponding to the sample images to the sample images and listing the same; and transfer means for transferring the sample image list information to the retrieval information entry source.

3. A control method for controlling an image information input-output unit comprising a hypertext information retrieval environment and management means for managing retrieval information and control information in correspondence with each other for driving image processing means based on the control information, thereby performing input-output processing of image information, said control method comprising the steps of:

receiving the retrieval information;

looking up in said management means based on the received retrieval information and converting the retrieval information into the predetermined control information;

controlling operation of said image processing means based on the control information into which the retrieval information is converted; and transferring image information provided by said image processing means to an entry source of the retrieval information.

4. The control method as claimed in claim 3, further comprising the steps of:

relating a sample image generation request to predetermined retrieval information for managing them in said management means;

determining whether or not the sample image generation request is received;

generating prediction results of image information input-output processing based on a plurality of preset control information pieces as sample images if the sample image generation request is received;

generating sample image list information for relating the retrieval information pieces corresponding to the sample images to the sample images and listing the same; and transferring the sample image list information to the retrieval information entry source.

5. The control method as claimed in claim 3 or 4, further comprising the step of receiving data to be processed by said image processing means.

6. An image information processing system comprising:

an image information input-output unit having a hypertext information retrieval environment; and an information terminal having read retrieval means for reading and retrieving the information retrieval environment, wherein said image information input-output unit comprises, management means for managing retrieval information and the control information in correspondence with each other, conversion means for looking up in said management means based on the retrieval information entered through said read retrieval means and converting the retrieval information into predetermined control information, and control means for controlling operation of image processing means based on the control information into which the retrieval information is converted by said conversion means.

7. The image information processing system as claimed in claim 6, wherein said management means relates a sample image generation request to predetermined retrieval information for managing them, and wherein said information retrieval environment comprises:

sample image generation means for generating prediction results of image information input-output processing based on a plurality of preset control information pieces as sample images if the sample image generation request occurs as the predetermined retrieval information is received from said read retrieval means;

sample image list information generation means for generating sample image list information for relating the retrieval information pieces corresponding to the sample images to the sample images and listing the same; and transfer means for transferring the sample image list information to said read retrieval means.

8. An image information input-output unit for driving image processing means based on control information, thereby performing input-output processing of image information, said image information input-output unit comprising:

management means for managing control information and command information related to processing items that can be processed by said image processing means in correspondence with each other;

reception means for receiving a request for transferring a processing list information indicating the processing items processed by said image processing means;

processing list information generation means for relating command information pieces to the processing list information pieces and returning the information pieces to the processing list information transfer requester if the processing list information transfer request is received;

conversion means for converting the command information into predetermined control information based on said management means if the command information is entered based on the processing list information; and control means for causing said image processing means to perform the processing item based on the predetermined control information into which the command information is converted.

9. The image information input-output unit as claimed in claim 8, wherein the processing list information is information listing prediction results of image processing performed by said image processing means as sample images.

10. An image information processing system comprising:
an image information input-output unit for driving image processing means based on control information, thereby performing input-output processing of image information; and
an information terminal for entering information in said image information input-output unit, thereby causing said image information input-output unit to perform desired image processing, wherein
said image information input-output unit comprises,
management means for managing control information and command information related to processing items that can be processed by said image processing means in correspondence with each other,
reception means for receiving a request for transferring a processing list information indicating the processing items processed by said image processing means from said information terminal,
processing list information generation means for relating command information pieces to the processing list information pieces and returning the information pieces to said information terminal if the processing list information transfer request is received,
conversion means for converting the command information into predetermined control information based on said management means if the command information is entered from said information terminal based on the processing list information, and
control means for causing said image processing means to perform the processing item based on the predetermined control information into which the command information is converted, and wherein
said information terminal comprises,
processing list information transfer request generation means for generating the processing list information transfer request,
selection means for selecting a desired processing item based on the processing list information returned from said processing list information generation means; and
selection information input means for entering the command information related to the selected processing item in said image information input-output unit.

11. The image information processing system as claimed in claim 10, wherein the processing list information is information listing prediction results of image processing performed by said image processing means as sample images.

12. The image information processing system as claimed in claim 10 or 11, wherein said information terminal further includes storage means for saving the selected command information.

13. A program recording medium for recording a computer-readable program for driving image processing means based on control information, thereby performing input-output processing of image information, said program recording medium for recording the program for causing a computer to provide:
a function of generating a hypertext information retrieval environment;
a management function of managing a URL information, using the information retrieval environment obtained from the hypertext information retrieval environment obtained from the hypertext information retrieval environment, and the control information in correspondence with each other, said URL information having a function of designating a plural of setting values simultaneously; and
a conversion function of converting entered URL information into predetermined control information.

14. The program recording medium as claimed in claim 13, wherein said management function relates a sample image generation request to predetermined retrieval information for managing them, and wherein
said program causes said computer to further provide:
a sample image generation function of generating prediction results of image information input-output processing based on a plurality of preset control information pieces as sample images if the sample image generation request occurs as the predetermined retrieval information is entered;
a sample image list information generation function of generating sample image list information for relating the retrieval information pieces corresponding to the sample images to the sample images and listing the same; and
a transfer function of transferring the sample image list information to the retrieval information entry source.

15. A program recording medium for recording a computer-readable program for driving image processing means based on control information, thereby performing input-output processing of image information said program recording medium for recording the program for causing a computer to provide:
a management function of managing control information and command information related to processing items that can be processed by said image processing means in correspondence with each other;
a reception function of receiving a request for transferring a processing list information indicating the processing items processed by said image processing means;
a processing list information generation function of relating command information pieces to the processing list information pieces and returning the information pieces to the processing list information transfer requester if the processing list information transfer request is received; and
a conversion function of converting the command information into predetermined control information based on said management means if the command information is entered based on the processing list information.

16. The program recording medium as claimed in claim 15, wherein the processing list information is information listing prediction results of image processing performed by said image processing means as sample images.

17. An image information input-output unit with a web server function, comprising:
image processing means for processing image information;
web page generation means for generating a web page having resource request information related to processing items that can be processed by said image processing means;
management means for managing the resource request information and the control information in correspondence with each other;
conversion means for converting the resource request information selected through the web page into predetermined control information based on said management means; and control means for controlling operation of said image processing means based on the control information into which the resource request information is converted.

18. The image information input-output unit as claimed in claim 17, wherein the resource request information contains history information of the selected processing item.

19. The image information input-output unit as claimed in claim 18, wherein said web page generation means analyzes received resource request information, detects the history information, and relates the resource request information containing the history information to the processing item, thereby generating the web page.

20. The image information input-output unit as claimed in claim 17, wherein the web page lists processing patterns that can be processed by said image processing means and the resource request information pieces for realizing the processing patterns are related to the processing patterns.

21. A control method for controlling an image information input-output unit with a web page function including management means for managing the resource request information and the control information in correspondence with each other for driving image processing means based on the control information, to perform input-output processing of image information, said control method comprising the steps of:

(a) generating a web page having resource request information related to processing items that can be processed by said image processing means;

(b) receiving resource request information specified through the web page;

(c) converting the received resource request information into predetermined control information based on said management means;

(d) controlling operation of said image processing means based on the control information into which the resource request information is converted; and (e) preparing a web page containing image information provided by said image processing means and transferring the web page to the resource request information entry source.

22. The control method as claimed in claim 21, wherein the resource request information contains history information of the selected processing item.

23. The control method as claimed in claim 22, wherein said first step web analyzes received resource request information, detects the history information, and relates the resource request information containing the history information to the processing item, thereby generating the web page.

24. The control means as claimed in claim 21, wherein the web page lists processing patterns that can be processed by said image processing means and the resource request information pieces for realizing the processing patterns are related to the processing patterns.

25. An image information processing system comprising:

an image information input-output unit having a web server function; and an information terminal having a web browser for using the web server function, wherein said image information input-output unit comprises,
image processing means driven based on control information, web page generation means for generating a web page having resource request information related to processing items that can be processed by said image processing means and transmitting the web page to said information terminal, management means for managing the resource request information and the control information in correspondence with each other, conversion means for converting the resource request information selected through the web page according to the web browser into predetermined control information based on said management means, and control means for controlling operation of said image processing means based on the control information into which the resource request information is converted.

26. The image information processing system as claimed in claim 25, wherein the resource request information contains history information of the selected processing item.

27. The image information processing system as claimed in claim 26, wherein said web page generation means analyzes received resource request information, detects the history information, and relates the resource request information containing the history information to the processing item, thereby generating the web page.

28. The image information processing system as claimed in claim 25, wherein the web page lists processing patterns that can be processed by said image processing means and the resource request information pieces for realizing the processing patterns are related to the processing patterns.

29. A program recording medium for recording a computer-readable program for driving image processing means based on control information, thereby performing input-output processing of image information, said program recording medium for recording the program for causing a computer to provide:

a web server function of providing a web page in response to resource request information;

a web page generation function of generating a web page having resource request information related to processing items that can be processed by said image processing means;

management means for managing the resource request information and the control information in correspondence with each other; and conversion means for converting the resource request information selected through the web page into predetermined control information based on said management function.

30. The program recording medium as claimed in claim 29, wherein the resource request information contains history information of the selected processing item.

31. The program recording medium as claimed in claim 30, wherein said web page generation function analyzes received resource request information, detects the history information, and relates the resource request information containing the history information to the processing item, thereby generating the web page.

32. The program recording medium as claimed in claim 29, wherein the web page lists processing patterns that can be processed by said image processing means and the resource request information pieces for realizing the processing patterns are related to the processing patterns.

* * * * *